US012769196B2

(12) United States Patent
Ikeda et al.

(10) Patent No.: US 12,769,196 B2
(45) Date of Patent: Oct. 20, 2026

(54) WAVELENGTH CONVERSION WHEEL, LIGHT SOURCE DEVICE, AND PROJECTION-TYPE IMAGE DISPLAY DEVICE

(71) Applicant: PANASONIC HOLDINGS CORPORATION, Osaka (JP)

(72) Inventors: Takashi Ikeda, Osaka (JP); Yusaku Nishikawa, Osaka (JP); Shigeyoshi Matsui, Osaka (JP); Taichi Yoshimura, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 0 days.

(21) Appl. No.: 19/277,751

(22) Filed: Jul. 23, 2025

(65) Prior Publication Data

US 2025/0347985 A1 Nov. 13, 2025

Related U.S. Application Data

(63) Continuation of application No. PCT/JP2024/000906, filed on Jan. 16, 2024.

(30) Foreign Application Priority Data

Jan. 24, 2023 (JP) ................................ 2023-008763

(51) Int. Cl.
*G03B 21/20* (2006.01)

(52) U.S. Cl.
CPC .................................. *G03B 21/204* (2013.01)

(58) Field of Classification Search
CPC .... G02B 5/20-289; G03B 21/00-2086; G03B 33/00-16
See application file for complete search history.

(56) References Cited

U.S. PATENT DOCUMENTS 9,164,274 B2 * 10/2015 Lin ...................... G03B 21/204
11,765,325 B2 * 9/2023 Oberascher ........ G03B 21/2066 348/744

(Continued)

FOREIGN PATENT DOCUMENTS

JP 9-233755 9/1997
JP 2012-193797 10/2012

(Continued)

OTHER PUBLICATIONS

English language translation of International Preliminary Report on Patentability issued Jul. 22, 2025 in corresponding International (PCT) Patent Application No. PCT/JP2024/000906.

(Continued)

*Primary Examiner* — Jason M Han
(74) *Attorney, Agent, or Firm* — Wenderoth, Lind & Ponack, L.L.P.

(57) ABSTRACT

A wavelength conversion wheel according to the present disclosure includes: a base plate rotatable around an axis; and at least one wavelength conversion element arranged on the base plate and the wavelength conversion element including a wavelength conversion material that is capable of converting incident light to light of a different wavelength. The wavelength conversion element includes at least one segment, the segment is defined by an inner arc edge, an outer arc edge, and both side edges each connecting two corresponding end points of the inner arc edge and the outer arc edge, the outer arc edge includes a first arcuate section having the same shape and arc length as that for the inner arc edge, and the wavelength conversion element is arranged so that concave sides of the inner arc edges and the outer arc edges face toward the inside of the base plate.

18 Claims, 28 Drawing Sheets

(56) References Cited

U.S. PATENT DOCUMENTS

| | | | |
|---|---|---|---|
| 2018/0329201 | A1 | 11/2018 | Kato |
| 2023/0314920 | A1 | 10/2023 | Yamagishi et al. |

FOREIGN PATENT DOCUMENTS

| | | |
|---|---|---|
| JP | 2022-92407 | 6/2022 |
| WO | 2017/081885 | 5/2017 |
| WO | 2021/181779 | 9/2021 |

OTHER PUBLICATIONS

International Search Report issued Feb. 27, 2024 in corresponding International Application No. PCT/JP2024/000906.

* cited by examiner

Figure 10A1
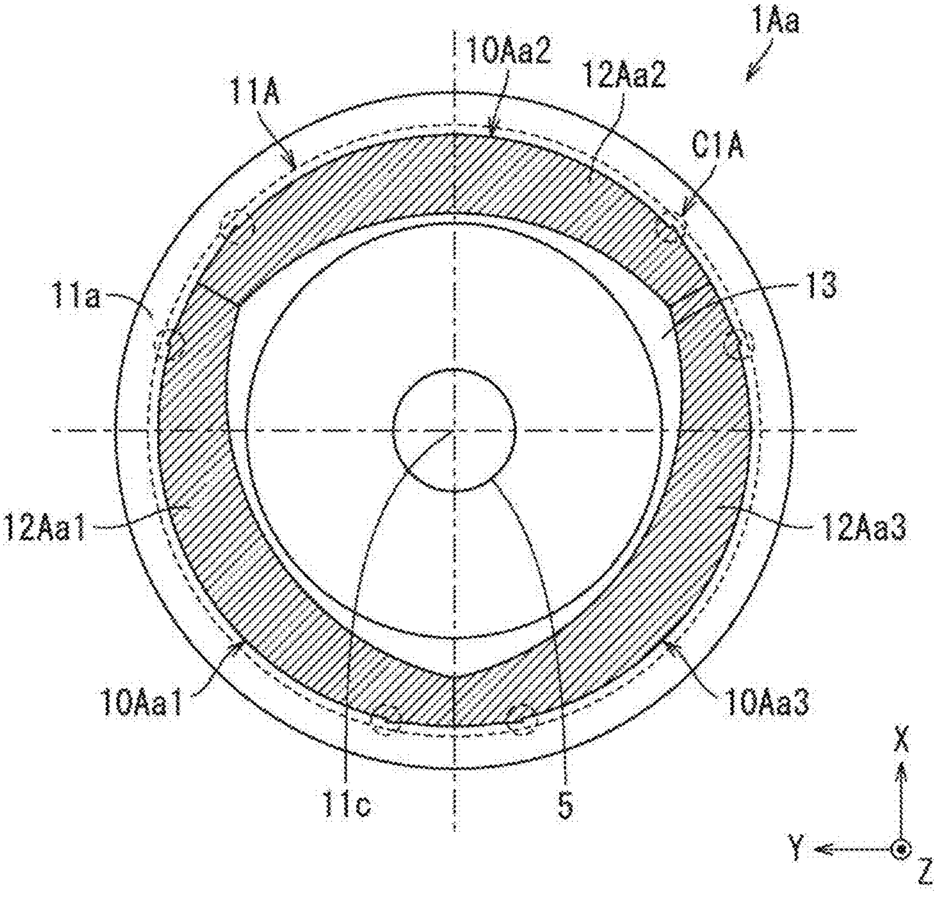

Figure 10B1
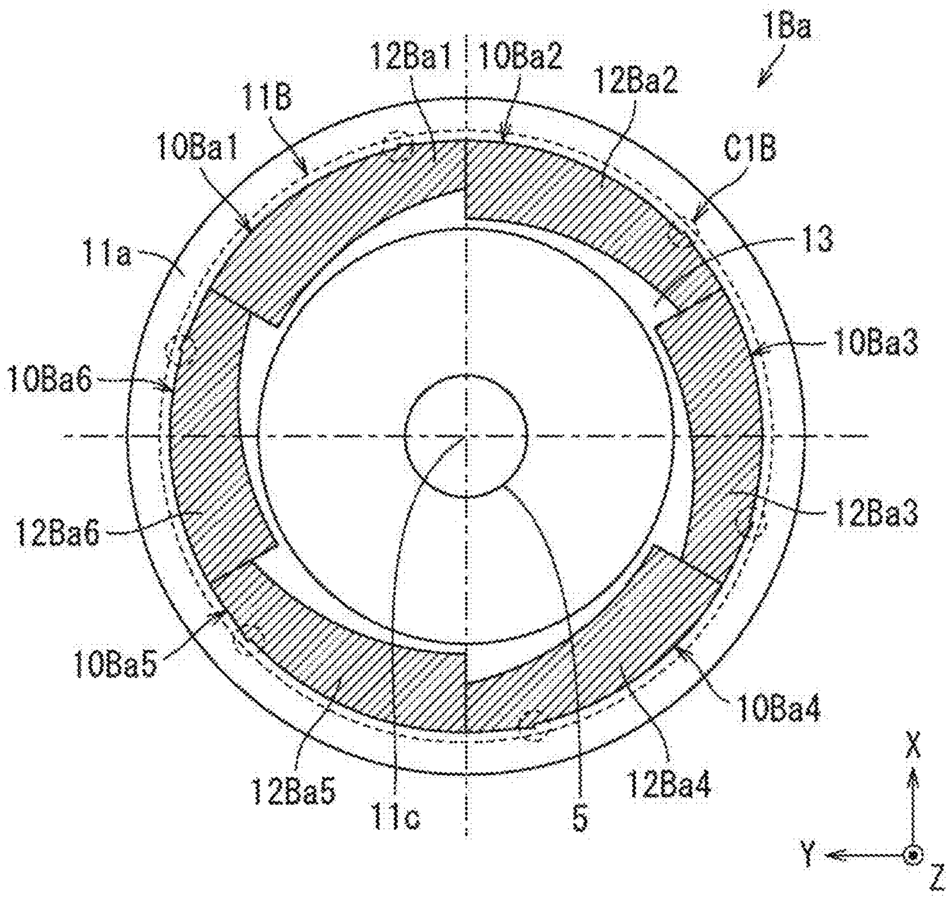

WAVELENGTH CONVERSION WHEEL, LIGHT SOURCE DEVICE, AND PROJECTION-TYPE IMAGE DISPLAY DEVICE

CROSS REFERENCE TO RELATED APPLICATION

This is a continuation application of International Application No. PCT/JP2024/000906 with an international filing date of Jan. 16, 2024, which claims priority of Japanese Patent Application No. 2023-008763 filed on Jan. 24, 2023, the content of which is incorporated herein by reference.

TECHNICAL FIELD

The present disclosure relates to wavelength conversion wheels used in, for example, light source devices of projection-type image display devices, light source devices, and projection-type image display devices.

BACKGROUND

Wavelength conversion wheels using wavelength conversion elements containing phosphors have been manufactured in two ways: one using a mixed-layer-type wavelength conversion element in which phosphor particles are dispersed in a resin paste and then applied; the other using a sintered-type wavelength conversion element made of a sintered body of phosphor particles. An example of the wavelength conversion wheel using a sintered-type wavelength conversion element is disclosed in WO2017081885.

Wavelength conversion wheels using the sintered-type wavelength conversion elements are superior in conversion efficiency and heat resistance to wavelength conversion wheels using the mixed-layer-type wavelength conversion elements, but the manufacturing cost of the wavelength conversion elements is an issue.

In manufacturing the wavelength conversion wheels, in addition to the method of making a phosphor ring of a sintered substrate and bonding it to a base plate, wavelength conversion elements can be made by cutting a plate-shaped sintered substrate into individual segments, for example by laser scribing, along breaking lines on the surface of the plate-shaped sintered substrate to construct a wavelength conversion wheel. In this case, the yield and production efficiency of the wavelength conversion wheel are greatly influenced by the arrangement of the segments forming the wavelength conversion elements on the plate-shaped sintered substrate and by the cutting distance required in cutting off the individual segments.

SUMMARY

It is therefore an object of the present disclosure to provide a wavelength conversion wheel that can improve the production efficiency and yield.

In order to address the issue described above, the present disclosure provides a wavelength conversion wheel configured to convert incident light into light of a different wavelength. A wavelength conversion wheel according to one aspect of the present disclosure includes: a base plate rotatable around an axis; and at least one wavelength conversion element arranged on the base plate and the at least one wavelength conversion element including a wavelength conversion material that is capable of converting incident light to light of a wavelength different from the wavelength of the incident light. The wavelength conversion element includes at least one segment, the segment is defined by an inner arc edge, an outer arc edge, and both side edges each connecting two corresponding end points of the inner arc edge and the outer arc edge, the outer arc edge includes a first arcuate section having the same shape and arc length as that for the inner arc edge, and the wavelength conversion element is arranged so that concave sides of the inner arc edges and the outer arc edges face toward the inside of the base plate.

According to the wavelength conversion wheel of the present disclosure, the production efficiency and yield can be improved.

BRIEF DESCRIPTION OF DRAWINGS

FIG. 10A1 is a schematic plan view showing a planar configuration example of a wavelength conversion wheel according to a variant of Example 1 of FIG. 10A;

FIG. 10B1 is a schematic plan view showing a planar configuration example of a wavelength conversion wheel according to a variant of Example 2 of FIG. 10B;

DETAILED DESCRIPTION

Figure 1:
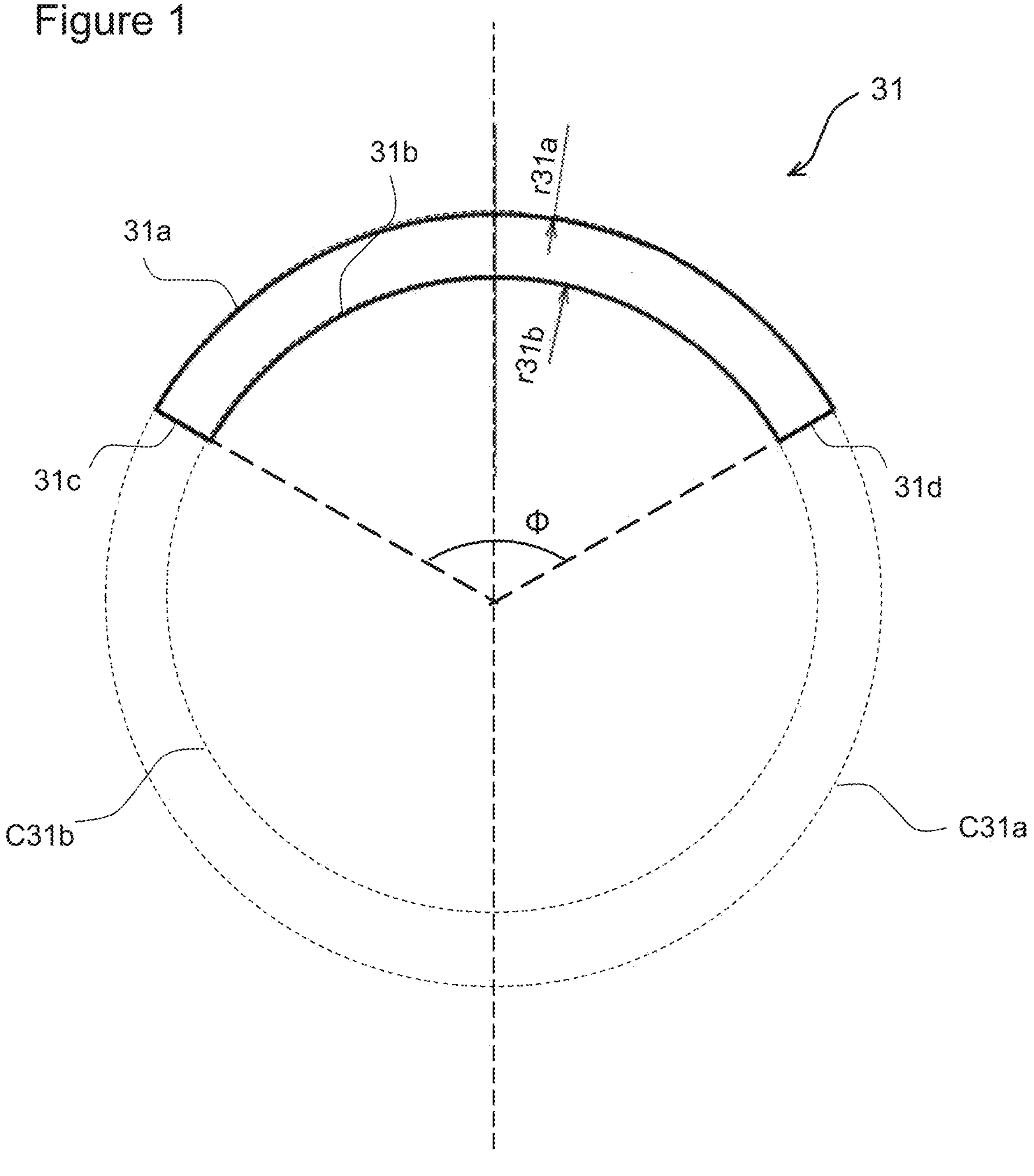
FIG. 1 is a diagram showing an annular segment constituting a conventional wavelength conversion element.

A wavelength conversion wheel configured to convert incident light into light of a different wavelength according to one aspect of the present disclosure includes: a base plate rotatable around an axis; and at least one wavelength conversion element arranged on the base plate and the at least one wavelength conversion element including a wavelength conversion material that is capable of converting incident light to light of a wavelength different from the wavelength of the incident light. The wavelength conversion element includes at least one segment, the segment is defined by an inner arc edge, an outer arc edge, and both side edges each connecting two corresponding end points of the inner arc edge and the outer arc edge, the outer arc edge includes a first arcuate section having the same shape and arc length as that for the inner arc edge, and the wavelength conversion element is arranged so that concave sides of the inner arc edges and the outer arc edges face toward the inside of the base plate.

According to this aspect, it is possible to provide a wavelength conversion wheel that can improve production efficiency and yield rate.

In addition, in a wavelength conversion wheel according to another aspect of the present disclosure, the outer arc edge has an inflection point in the vicinity of the side edge on at least a first side of the segment, between an endpoint of the outer arc edge on the first side and an endpoint of the first arcuate section on the first side, and an end portion of the outer arc edge including the inflection point has a shape different from the shape of the inner arc edge.

In addition, in a wavelength conversion wheel according to another aspect of the present disclosure, the end portion of the outer arc edge includes a second arcuate section and a third arcuate section, and the second arcuate section and the third arcuate section have opposite curvature directions and are in contact with each other at the inflection point.

In addition, in a wavelength conversion wheel according to another aspect of the present disclosure, the first arcuate section and the second arcuate section lie on a circumference of a first circle, the third arcuate section lies on a circumference of a second circle, and the first circle and the second circle are circles externally tangent to each other at the inflection point.

In addition, in a wavelength conversion wheel according to another aspect of the present disclosure, the end portion of the outer arc edge includes a rectilinear section passing through the inflection point.

In addition, in a wavelength conversion wheel according to another aspect of the present disclosure, the first arcuate section and one endpoint of the rectilinear section lie on a circumference of a first circle, one endpoint of the rectilinear section lies on a circumference of a second circle, and the first circle and the second circle are circles externally tangent to each other at the inflection point.

In addition, in a wavelength conversion wheel according to another aspect of the present disclosure, endpoints on the same side of the first arcuate section and the inner arc edge lie on a line orthogonal to a line connecting both endpoints of the inner arc edge.

In addition, in a wavelength conversion wheel according to another aspect of the present disclosure, endpoints on the same side of the first arcuate section and the inner arc edge lie on the side edge on one side.

In addition, in a wavelength conversion wheel according to another aspect of the present disclosure, the inflection point lies near the side edge on one side, and endpoints on the same side of the first arcuate section and the inner arc edge lie on the side edge on the other side.

In addition, in a wavelength conversion wheel according to another aspect of the present disclosure, the at least one wavelength conversion element is arranged in a ring shape around the axis, the ring shape including a missing part, and the base plate has an opening at a position corresponding to the missing part of the wavelength conversion element.

In addition, in a wavelength conversion wheel according to another aspect of the present disclosure, the at least one wavelength conversion element is arranged in a ring shape around the axis, the ring shape including a missing part, and the base plate has a reflective area at a position corresponding to the missing part of the wavelength conversion element.

In addition, in a wavelength conversion wheel according to another aspect of the present disclosure, the at least one wavelength conversion element is arranged in a ring shape around the axis, and a part area of the ring shape is configured to be a reflective area.

In addition, in wavelength conversion wheel according to another aspect of the present disclosure, the first arcuate section of the at least one wavelength conversion element is configured to be arranged along a circumference around the axis.

In addition, a wavelength conversion wheel according to another aspect of the present disclosure includes: at least two wavelength conversion elements including wavelength conversion materials that are capable of generating light of different wavelengths from each other.

In addition, a light source device according to another aspect of the present disclosure includes: a light source configured to emit incident light; and a wavelength conversion wheel according to an aspect of the present disclosure.

In addition, a projection-type image display device according to another aspect of the present disclosure includes: a light source device according to an aspect of the present disclosure; a light modulation element configured to modulate incident light based on an image signal; an illumination optical system configured to direct illumination light emitted from the light source device to the light modulation element; and a projection optical system configured to enlarge and project light output from the light modulation element to display an image.

Any of the above various aspects of the present disclosure may be appropriately combined to achieve their respective effects.

<Process Leading to the Present Invention>

The process leading to the present invention will first be described with reference to FIGS. 1 and 2.

FIG. 1 is a diagram showing an annular segment 31 constituting a conventional wavelength conversion element. FIG. 2 is a conceptual diagram showing a plurality of annular segments of FIG. 1 arranged on a plate-shaped sintered substrate 30, with an enlarged view of a partial region. A wavelength conversion wheel is used, for example, in projection-type image display devices, and is used to convert incident light into light of one or more different wavelengths. The wavelength conversion wheel used in the projection-type image display device is generally configured by attaching wavelength conversion elements to a rotatable disk-shaped base plate in a ring shape, and the wavelength conversion elements include a wavelength conversion material that is capable of generating light of a wavelength different from that of the incident excitation light. Wavelength conversion materials include, but not limited to, for example, various phosphors that generate fluorescence of various wavelengths by excitation of incident light.

Conventional wavelength conversion elements are generally composed of annular segments 31 as shown in FIG. 1. As shown in the figure, the annular segment 31 has an annular region surrounded by an outer arc 31*a* and an inner arc 31*b* having the same central angle Φ, and side edges 31*c*, 31*d* on both sides. The outer arc 31*a* is on a circumference C31*a* with a radius of curvature r31*a*, and the inner arc 31*b* is on a circumference C31*b* with a radius of curvature r31*b* different from the circle C31*a*. Wavelength conversion elements composed of such annular segments can be fixed on a base plate such that the outer arcs form a circumference, whereby a wavelength conversion wheel having a ring-like planar shape can be formed.

The annular segment 31 shown in FIG. 1 is formed by cutting a plate-shaped sintered substrate into individual pieces. In order to increase the utilization rate of the plate-shaped sintered substrate, annular segments having the same shape may be arranged to form segment rows 31A, 32A, and 33A with aligned side edges in the plate-shaped sintered substrate 30, as shown in FIG. 2. In addition, adjacent segment rows may be arranged in opposite directions with their side edges in contact with each other. As used herein, the term "segment" refers to a sintered substrate having a predetermined shape for forming a wavelength conversion element, and refers to a portion that is individualized from the plate-shaped sintered substrate.

Figure 2:
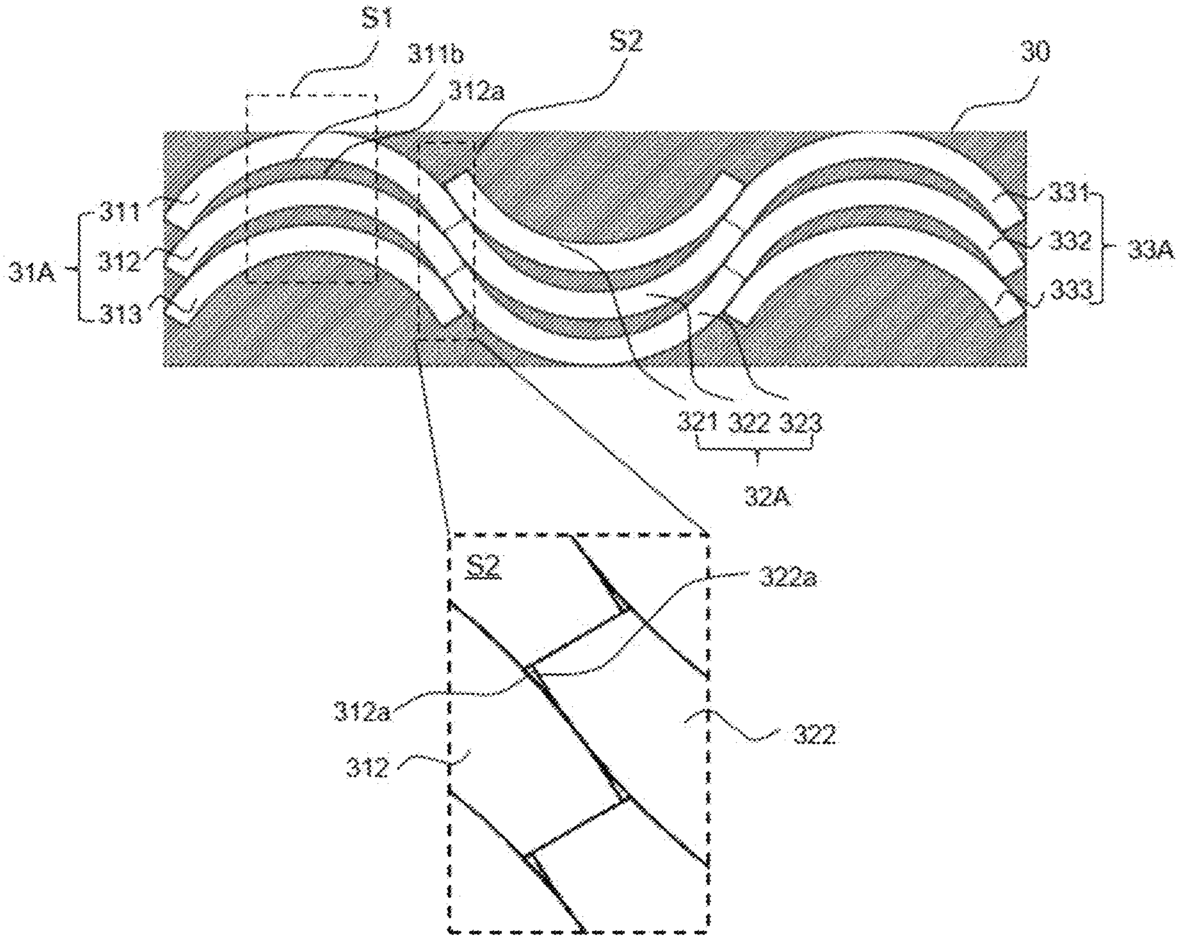
FIG. 2 is a conceptual diagram of a plurality of annular segments of FIG. 1 arranged on a plate-shaped sintered substrate, and an enlarged view of a partial region thereof.

In the arrangement shown in FIG. 2, however, for example, the inner arc 311*b* of the annular segment 311 and the outer arc 312*a* of the adjacent annular segment 312 do not contact with each other in a central region S1 of the same segment row. Thus, in order to separate the annular segment 311 and the annular segment 312, it is required to cut along the respective breaking lines of the arcs 311*b* and 312*a*. Also, as shown in the enlarged view, in an end region S2 where the adjacent segment rows are in contact, for example, the outer arc 312*a* of the annular segment 312 and the outer arc 322*a* of the annular segment 322 are separated partially and thus do not have a common breaking line. Therefore, in order to separate the adjacent arcs in the end region S2, cutting process along respective breaking lines is required.

The inventor(s) studied wavelength conversion wheels for reducing the cutting distance in separating individual segments from a plate-shaped sintered substrate and so that to enable easy and efficient separation of the segments constituting wavelength conversion elements, and thus arrived at the present invention.

Embodiments will hereinafter be described in detail with reference to the drawings as appropriate. However, more detailed explanation than necessary may be omitted. For example, detailed explanation of already well-known matters or duplicate explanation of substantially the same configuration may be omitted. This is to avoid the following explanation becoming unnecessarily redundant and to facilitate understanding by those skilled in the art.

Light source devices according to a first embodiment of the present disclosure and projection display devices including such light source devices will be described with reference to FIGS. 3A to 18. The accompanying drawings and the following description are provided to enable those skilled in the art to fully understand the present disclosure, but not intended to limit the subject matter described in claims. In addition, in each drawing, each element is exaggerated for ease of explanation. The same reference numerals are imparted to substantially the same components in the drawings.

<Segment Constituting Wavelength Conversion Element>

First Embodiment

Figure 3A:
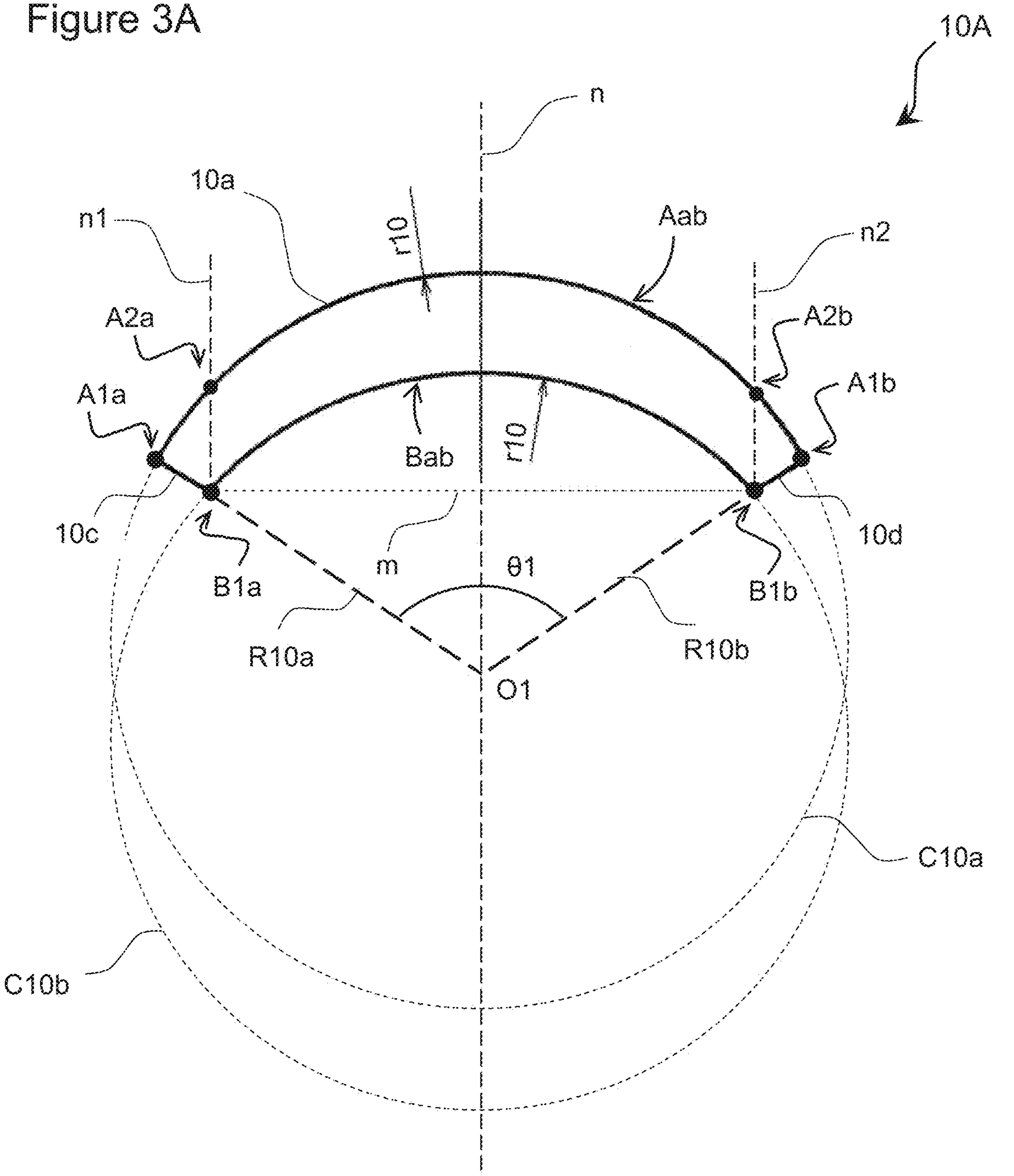
FIG. 3A is a diagram showing a configuration example of a segment constituting a wavelength conversion element according to Example 1 of a first embodiment.
Figure 3B:
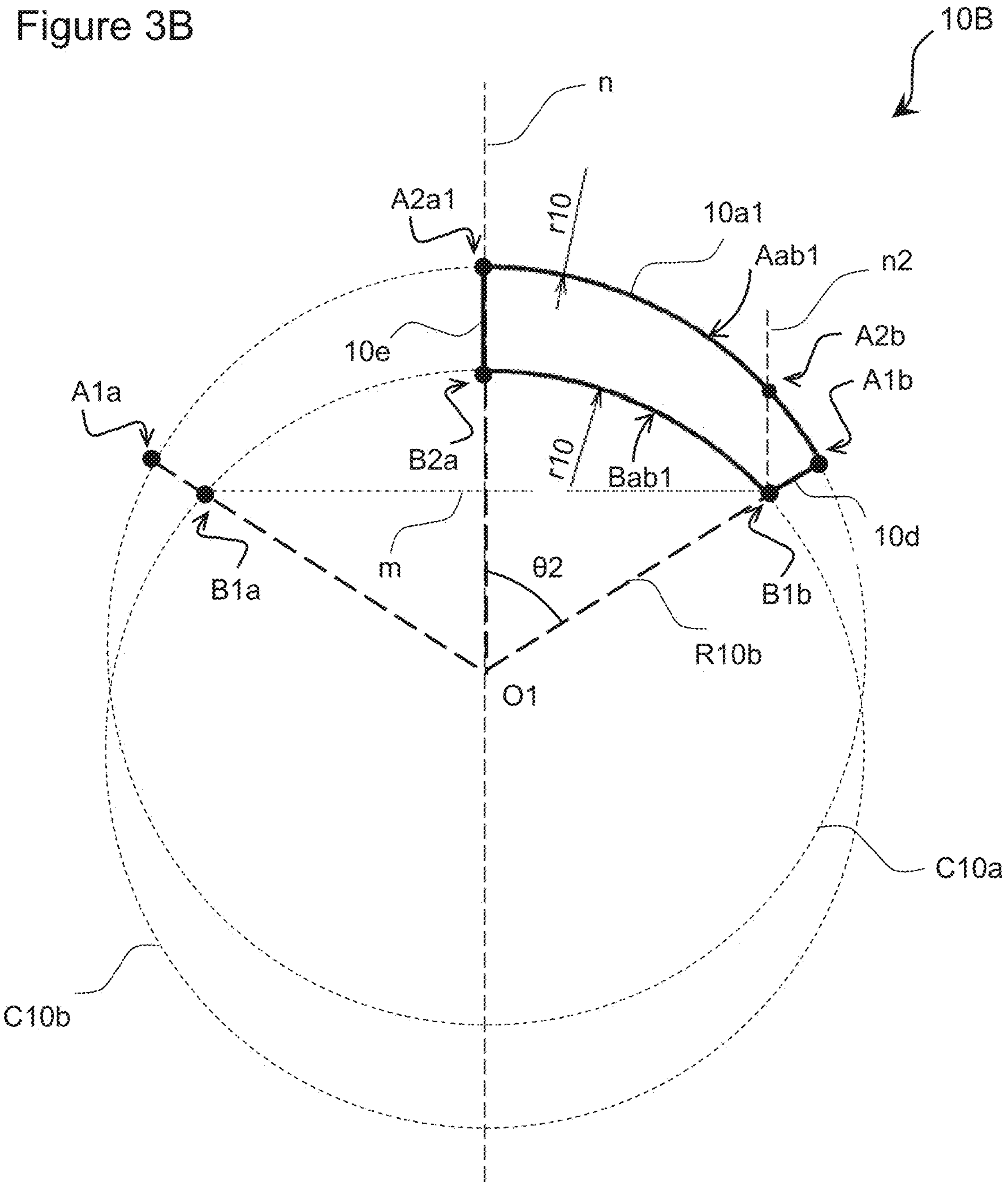
FIG. 3B is a diagram showing a configuration example of a segment constituting a wavelength conversion element according to Example 2 of the first embodiment.
Figure 4A:
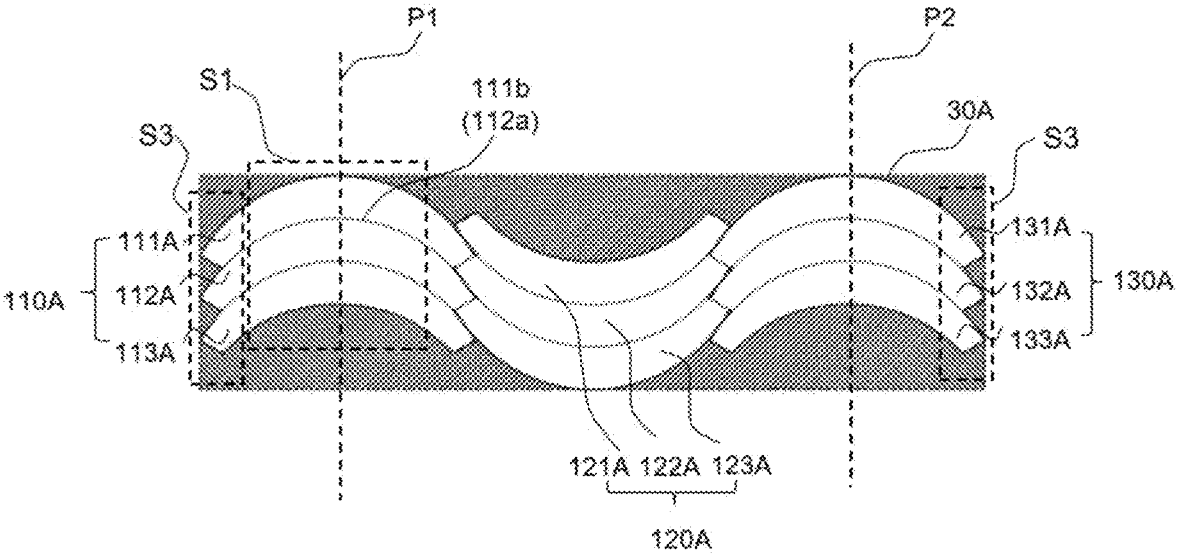
FIG. 4A is a conceptual diagram showing a plurality of the segments of FIG. 3A arranged on a plate-shaped sintered substrate.
Figure 4B:
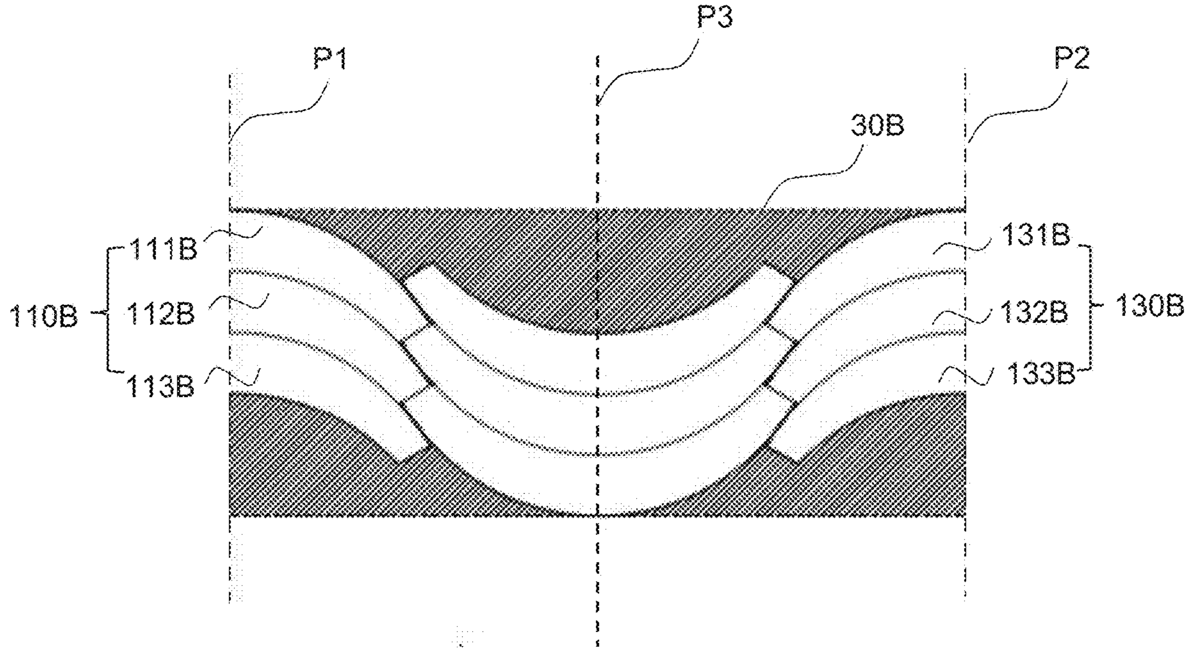
FIG. 4B is a conceptual diagram showing a plurality of the segments of FIG. 3B arranged on a plate-shaped sintered substrate.

A segment constituting a wavelength conversion element according to a first embodiment of the present disclosure will be described with reference to FIGS. 3A to 4B. FIG. 3A is a diagram showing a configuration example of a segment 10A constituting a wavelength conversion element according to Example 1 of the first embodiment of the present disclosure. FIG. 3B is a diagram showing a configuration example of a segment 10B constituting a wavelength conversion element according to Example 2 of the first embodiment of the present disclosure. FIG. 4A is a conceptual diagram showing a plurality of segments of FIG. 3A arranged on a plate-shaped sintered substrate 30A. FIG. 4B is a conceptual diagram showing a plurality of segments of FIG. 3B arranged on a plate-shaped sintered substrate 30B. In this specification, the length of the radius for determining the geometric shape of a circle is described as the "radius of curvature", and the line connecting the center of the circle and a point on the circumference is distinguished by the term "radius".

The segment 10A shown in FIG. 3A has an arch shape defined by an outer arc edge Aab, an inner arc edge Bab, and both side edges 10*c*, 10*d* connecting endpoints A1*a*, A1*b* and endpoints B1*a*, B1*b* of outer arc edge Aab and the inner arc edge Bab, respectively. The outer arc edge Aab of the segment 10A includes a first arcuate section 10*a* between endpoints A2*a* and A2*b*. In this embodiment, an endpoint A2*a* of the first arcuate section 10*a* and an endpoint B1*a* of the inner arc edge Bab are on a line n1 orthogonal to the line m connecting endpoints of the inner arc edge Bab, and an endpoint A2*b* of the first arcuate section 10*a* and an endpoint B1*b* of the inner arc edge Bab are on a line n2 orthogonal to the line m connecting endpoints of the inner arc edge Bab. Thus, the first arcuate section 10*a* has substantially the same shape and arc length as the inner arc edge Bab.

In this embodiment, the first arcuate section 10*a* is on the circumference of a circle C10*a* having a radius of curvature r10 centered at O1, and the endpoints A1*a* and A1*b* of the outer arc edge Aab are on the circumference of the circle C10*a* and are on a pair of radii R10*a* and R10*b* that form a central angle θ1. The inner arc edge Bab is on the circumference of a circle C10*b*, and the endpoints B1*a* and B1*b* are on the radii R10*a* and R10*b*, respectively. The circle C10*a* and the circle C10*b* are circles having the same radius of curvature r10 and different centers. However, the present disclosure is not limited thereto. The first arcuate section 10*a* and the inner arc edge Bab may each have an arc shape, but not limited to circular arcs. Further, in this embodiment, as shown in the figure, the segment 10A is configured symmetrically with respect to the center line n, and the first arcuate section 10*a* and the inner arc edge Bab are configured symmetrically with respect to the center line n. However, the present disclosure is not limited thereto. For example, the first arcuate section 10*a* may be configured asymmetrically with respect to the center line n, or the segment 10A may have an asymmetrical configuration with respect to the center line n. In the following description, for convenience of explanation, the segment 10A in FIG. 3A is referred to as an "arched segment".

In addition, in this specification, "the same shape and arc length" does not only mean exactly the same shape or arc length, but may actually take into account processing tolerances and may be, for example, substantially the same shape or arc length including an error of about +5 degrees, for example, an error of about +0.5 mm.

In FIG. 3A, the segment 10A is shown configured with a central angle θ1 of approximately 120 degrees. However, the present disclosure is not limited thereto. Depending on the intended uses, the segment can be configured with any central angle less than 360 degrees, and preferably can be configured with a central angle of 180 degrees or less.

In this embodiment, the side edges 10*c*, 10*d* are configured to be on the radii R10*a* and R10*b*, respectively. However, the present disclosure is not limited thereto. The side edges of the segments may have any length and may be configured, for example, by lines or curves that are not located on radii, depending on the intended uses.

The arched segment 10B shown in FIG. 3B has an asymmetrical configuration and may be formed to be substantially a portion of the arched segment 10A shown in FIG. 3A. In the following description, for convenience of explanation, arched segments shaped as the segment 10B of FIG. 3B will be referred to as the "partially arched segment".

As shown in FIG. 3B, the partially arched segment 10B has a shape defined by the arc edge Aab1, Bab1, and the side edges 10*e*, 10*d* on both sides. The outer arc edge Aab1 is a part of the outer arc edge Aab of the segment 10A, and the inner arc edge Bab1 is a part of the inner arc edge Bab. The outer arc edge Aab1 includes a first arcuate section 10*a*1 between endpoints A2*a*1 and A2*b*. In this embodiment, the first arcuate section 10*a*1 and the inner arc edge Bab1 are arcs on the circles C10*a* and C10*b*, respectively, and the circles C10*a* and C10*b* have the same radius of curvature r10.

In this embodiment, the endpoint A2*a*1 of the first arcuate section 10*a*1 of the outer arc edge Aab1 and the endpoint B2*a* of the inner arc edge Bab lie on the side edge 10*e* of the partially arched segment 10B. The first arcuate section 10*a*1 between the endpoints A2*a*1 and A2*b* has substantially the same shape and arc length as the inner arc edge Bab1.

As shown in the figure, in this embodiment, the partially arched segment 10B can be formed from the arched segment 10A by cutting the inner arc edge Bab with a secant line n perpendicular to the line m connecting the both endpoints of the inner arc edge. The wavelength conversion element formed by such made partially arched segments can be easily arranged in rotational symmetry on the disk-shaped base plate of the wavelength conversion wheel.

In this embodiment, the partially arched segment 10B shown in FIG. 3B is a half-arched segment made by cutting the arched segment 10A with the center line n. Thus, the central angle θ2 of the partially arched segment 10B is half of the central angle θ1 of the arched segment 10A. The central angle θ2 in FIG. 3B is about 60 degrees. However, the present disclosure is not limited thereto. The partially arched segment may be made by cutting an arched segment with another secant line, and may be configured to, for example have any central angle less than 360 degrees. Moreover, the partially arched segment is preferably configured to have a central angle of 180 degrees or less, and more preferably configured to have a central angle of 90 degrees or less.

In the plate-shaped sintered substrate 30A shown in FIG. 4A, a plurality of identical arched segments form segment rows 110A, 120A, and 130A with aligned side edges, and adjacent segment rows are arranged in opposite directions with their side edges in contact with each other. In contrast to the annular segments shown in FIG. 2, for example, in the central region S1 of the same segment row, an inner arc edge 111*b* of an arched segment 111A and a first arcuate section 112*a* of the outer arc edge of a vertically adjacent arched segment 112A contact with each other. This allows for separating the upper and lower adjacent arched segments along a common breaking line, thereby reducing the cutting distance for separating individual segments.

In the arrangement shown in FIG. 4A, in the process of separating the segments into individual pieces, for example, the cutting process starts from the end region S3 of the plate-shaped sintered substrate 30A, and proceeds by repeatedly cutting along the side edge of the row of segments with a sawtooth-like breaking line. For example, the plate-shaped sintered substrate 30A can be cut along lines P1 and P2 shown in FIG. 4A to obtain the plate-shaped sintered substrate 30B shown in FIG. 4B, from which the partially arched segment 10B shown in FIG. 3B can be separated. As shown, the plate-shaped sintered substrate 30B does not have an end region S3 including sawtooth-like breaking lines. Thus, rows 110B and 130B of the partially arched segments can be easily separated from the end of the plate-shaped sintered substrate 30B. Next, for example, by further cutting along the line P3 shown in FIG. 4B, partially arched segments can be easily separated from the center of the plate-shaped sintered substrate 30B. Thus, partially arched segments can be fabricated with a simplified and efficient cutting process.

In this manner, the arched segments or the partially arched segments according to the first embodiment are configured to include a first arcuate section of the outer arc edge and an inner arc edge with curvature matched each other, thereby enabling to separate the segments arranged in a segment row along a common breaking line. Thus, production efficiency and yield can be improved with a reduced cutting distance for separating individual segments.

Second Embodiment

Figure 5:
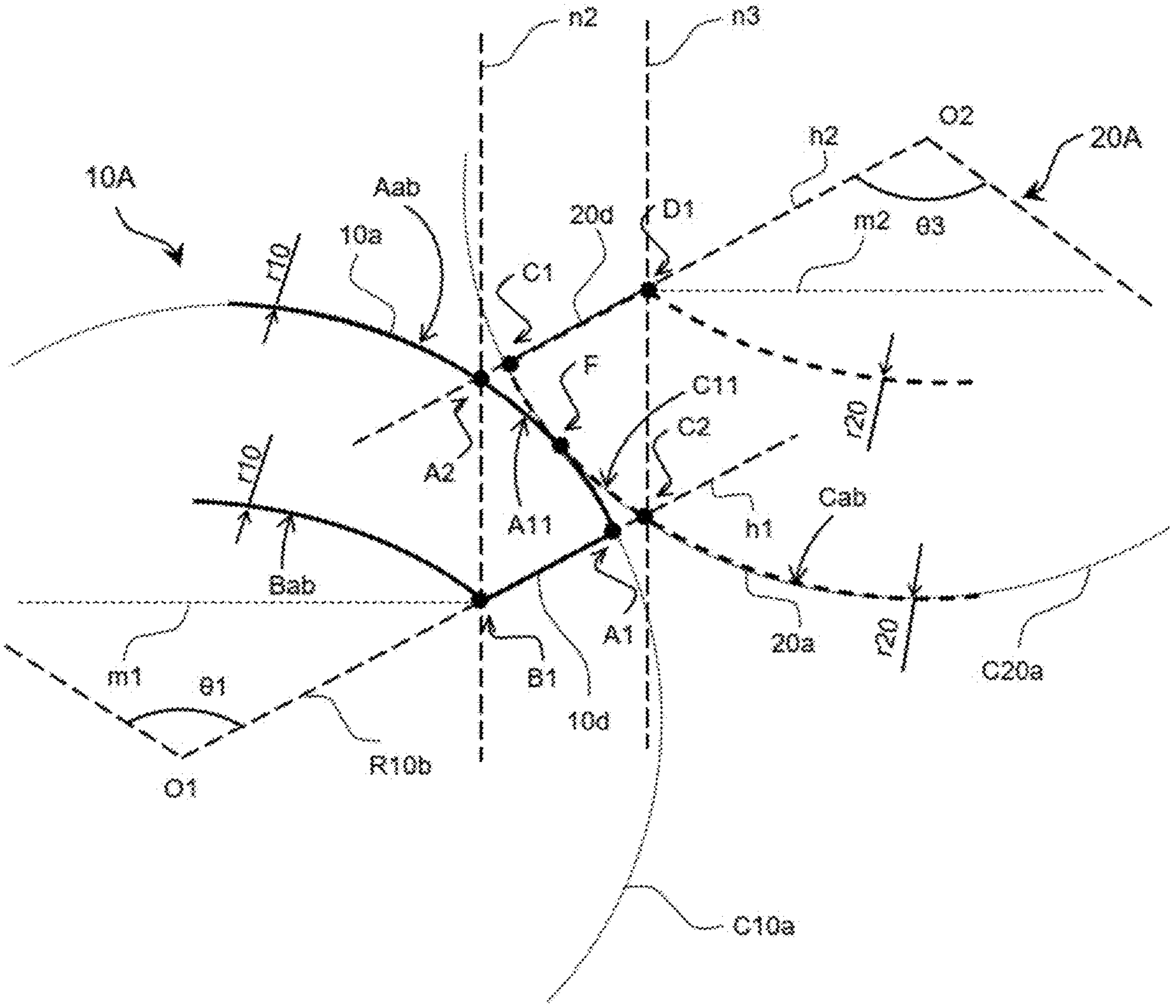
FIG. 5 is a diagram showing an outer arc edge of a segment constituting a wavelength conversion element according to a second embodiment of the present disclosure.
Figure 7:
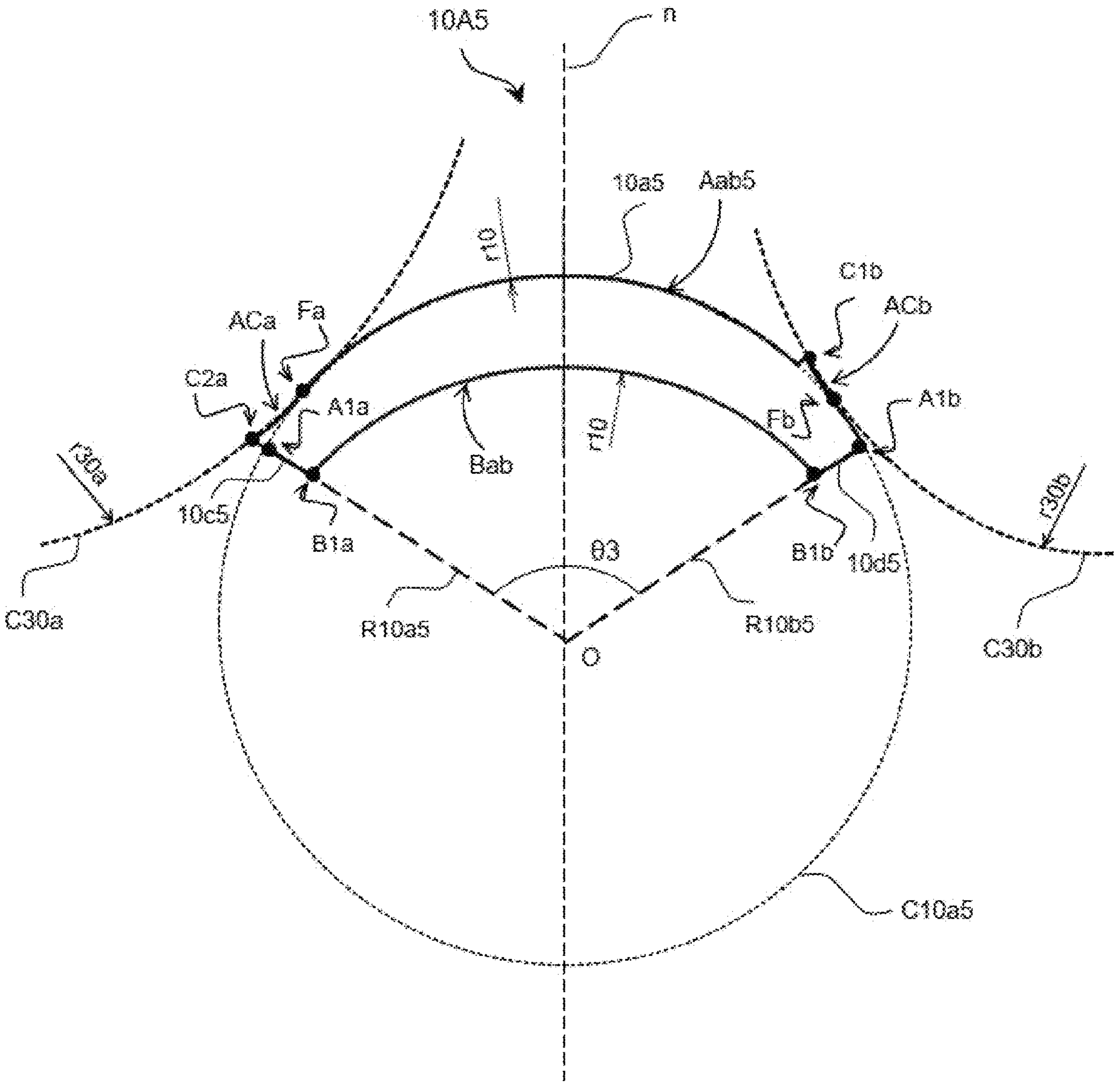
FIG. 7 is a diagram showing a configuration example of a segment constituting a wavelength conversion element according to the second embodiment.
Figure 8:
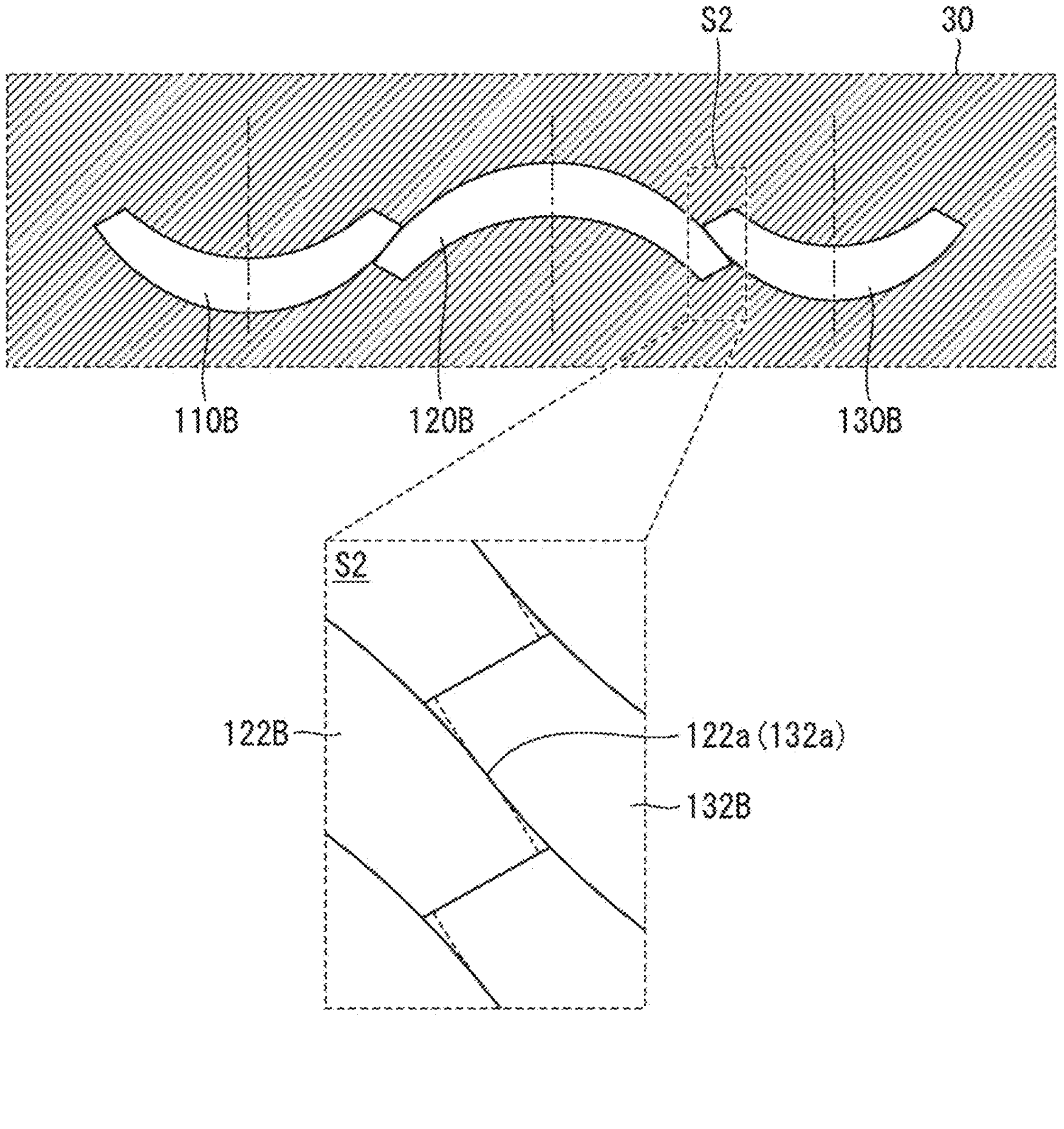
FIG. 8 is a simplified conceptual diagram of a plurality of segments according to the second embodiment arranged on a plate-shaped sintered substrate and an enlarged view of a partial region thereof.

Segments constituting a wavelength conversion element according to a second embodiment of the present disclosure will be described with reference to FIGS. 5 to 8. FIG. 5 is a diagram showing the outer arc edge of a segment constituting the wavelength conversion element according to the second embodiment of the present disclosure. FIGS. 6A to 6D are diagrams showing configuration examples of the outer arc edge of a segment according to each of Examples 1 to 4 of the second embodiment. FIG. 7 is a diagram showing a configuration example of a segment 10A5 constituting the wavelength conversion element according to the second embodiment of the present disclosure. FIG. 8 is a simplified conceptual diagram of a plurality of segments according to the second embodiment of the present disclosure arranged on a plate-shaped sintered substrate 30 and an enlarged view of the partial region S2. It should be understood that the configuration of the outer arc edge of the segments according to the present disclosure is not limited to the configuration examples shown in FIGS. 5 to 7.

The segments constituting the wavelength conversion elements according to the second embodiment of the present disclosure have a basic shape of the arched segment 10A shown in FIG. 3A or the partially arched segment 10B shown in FIG. 3B. The outer arc edges of the segments shown in FIGS. 5 to 7 may be applied to the arched segment or the partially arched segment, for example. In the following description, the "arched segment" and the "partially arched segment" are integrally referred to as "segment".

As shown in FIG. 5, the outer arc edge Aab (only a portion is shown) of the segment 10A having the basic shape shown in FIG. 3A or 3B has an outer arc edge near the side edge 10*d*. The outer arc edge has an inflection point F between an endpoint A1 of the outer arc edge Aab and an endpoint A2 of the first arcuate section 10*a*, and may have a different shape from the inner arc edge Bab. The "inflection point" here refers to a point at which the arc changes from concave to convex or vice versa.

FIGS. 5 to 7 show the outer arc edges of adjacent segments. In the embodiment shown in FIG. 5, the segment 10A and the segment 20A adjacent to the segment 10A have the basic shape shown in FIG. 3A or 3B. The first arcuate section 10*a* of the outer arc edge Aab (only a part of which is shown) of the segment 10A and a first arcuate section 20*a* of the outer arc edge Cab (only a part of which is shown) of the segment 20A are on a circle C10*a* and a circle C20*a*, respectively, and the circles C10*a* and C20*a* are externally tangent to each other at the inflection point F. A radius of curvature r20 of the circle C20*a* and the radius of curvature r10 of the circle C10*a* may be the same or different.

In this embodiment, an outer arc edge of the outer arc edge Aab including the inflection point F is formed near the side edge 10*d* of the segment 10A, and the inflection point F is between the endpoint A1 of the outer arc edge Aab and the endpoint A2 of the first arcuate section 10*a*. In addition, the outer arc edge of the outer arc edge Aab can be formed to have an arcuate section including the inflection point F or a rectilinear section passing through the inflection point F to form a common outer arc edge of the adjacent segments 10A and 20A. In this case, the common outer arc edge of the adjacent segments 10A and 20A can be defined by the inflection point F, the endpoints A1 and A2 on the outer arc edge Aab of the segment 10A, and the endpoints C1 and C2 on the outer arc edge Cab of the segment 20A. In this embodiment, the inflection point F and the endpoints C1 and C2 are positioned by the radius of curvature r10 of the circle C10*a*, the radius of curvature r20 of the circle C20*a*, the central angle θ1 of the segment 10A, and a central angle θ3 of the segment 20A. In this embodiment, θ1 and θ3 have the same value.

For example, in this embodiment, an endpoint C2 is defined as the intersection point of a line h1 and the circle C20*a*, where the line h1 includes a radius R10*b* having an endpoint B1 of the segment 10A. An endpoint C1 is defined as the intersection point of a line h2 and the circle C20*a*, where the line h2 is parallel to the line h1, passing through the endpoint A2. In this case, as shown in the figure, the inflection point F is substantially the intersection point of the diagonals of a parallelogram consisting of the endpoints A2 and B1 of the segment 10A and the endpoint C2 and D1 of the segment 20A. The configuration of the segments or the positioning of the endpoints A1, A2, C1, C2 and the inflection point F may take into consideration the tolerance in machining, and in this specification, for example, the "intersection" between lines or between a line and a circle may include an error of, for example, about ±0.5 mm, and the direction of the arc may include an error of, for example, about ±5 degrees.

Figure 6A:
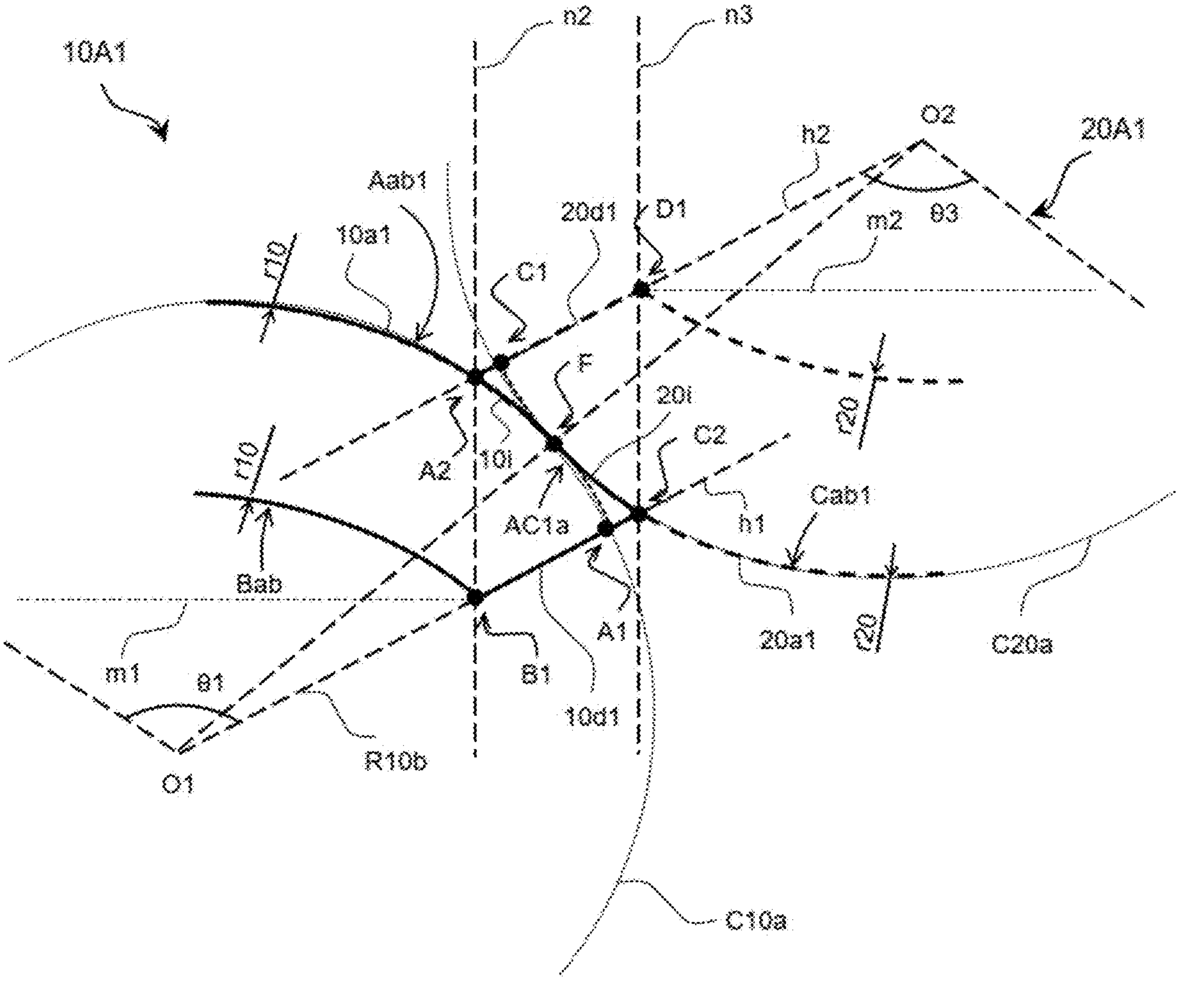
FIG. 6A is a diagram showing a configuration example of an end portion of an outer arc edge of a segment according to Example 1 of the second embodiment.

In Example 1 shown in FIG. 6A, adjacent segments 10A1 and 20A1 have a common end portion of the outer arc edges. The segment 10A1 includes an endpoint C2 located on the segment 20A1, and the segment 20A1 includes an endpoint A2 located on the segment 10A1. The segment 10A1 has a side edge 10*d*1 defined by the endpoints B1 and C2, and the segment 20A1 has a side edge 20*d*1 defined by the endpoints D1 and A2. In this case, segments 10A1 and 20A1 have a common inflection arc edge section AC1*a*. The inflection arc edge section AC1*a* is formed by a second arcuate section 10*i* on the circumference of the circle C10*a* and a third arcuate section 20*i* on the circumference of the circle C20*a*. The second arcuate section 10*i* and the third arcuate section 20*i* are in contact at the inflection point F. The inflection arc edge section AC1*a* is defined by a curve connecting the endpoints A2 and C2, and the curve changes direction at the inflection point F. As shown in the figure, the second arcuate section 10*i* between the endpoints A2 and the inflection point F and the third arcuate section 20*i* between the inflection point F and the endpoint C2 have opposite curvature directions. The "curve direction" here means that the slope of the tangent to the arc increases or decreases when proceeding along the arc, and the "opposite curvature direction" means that the slope of the tangent to the arc changes from increasing to decreasing or from decreasing to increasing. For example, the second arcuate section 10*i* and the third arcuate section 20*i* shown in FIG. 6A change in the way that the arc bends from a decreasing slope to an increasing slope at the inflection point F.

Figure 6B:
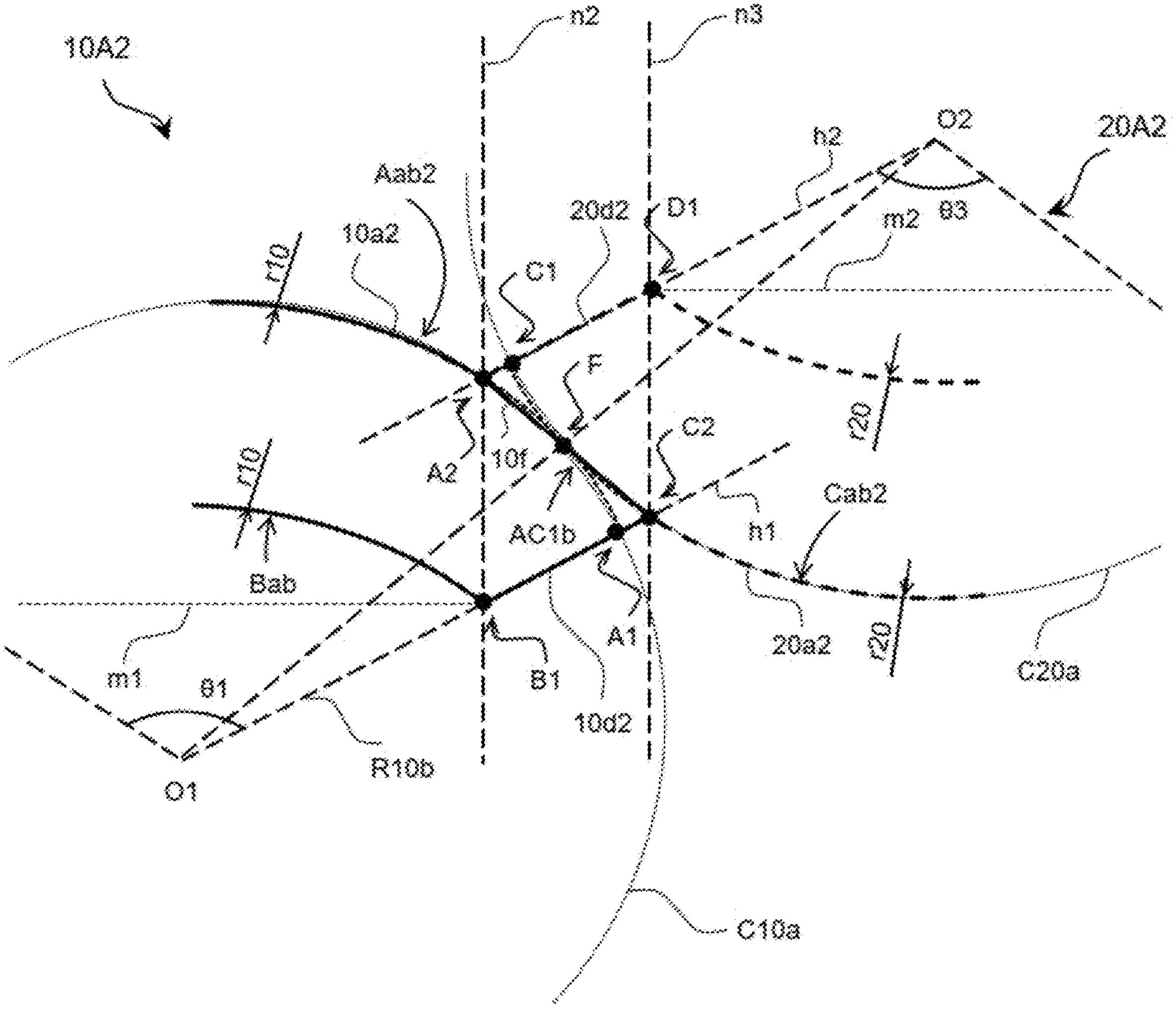
FIG. 6B is a diagram showing a configuration example of an end portion of an outer arc edge of a segment according to Example 2 of the second embodiment.

Next, in Example 2 shown in FIG. 6B, similar to Example 1, a common end portion of the outer arc edges is formed between adjacent segments 10A2 and 20A2. The segment 10A2 includes an endpoint C2 located on the segment 20A2, and the segment 20A2 includes an endpoint A2 located on the segment 10A2. The segment 10A2 has a side edge 10*d*2 defined by the endpoints B1 and C2, and the segment 20A2 has a side edge 20*d*2 defined by the endpoints D1 and A2. In this case, segments 10A2 and 20A2 have a common rectilinear section AC1*b*. The rectilinear section AC1*b* is formed by a straight line 10*f* connecting the endpoints A2 and C2, and the straight line 10*f* substantially passes through the inflection point F.

Figure 6C:
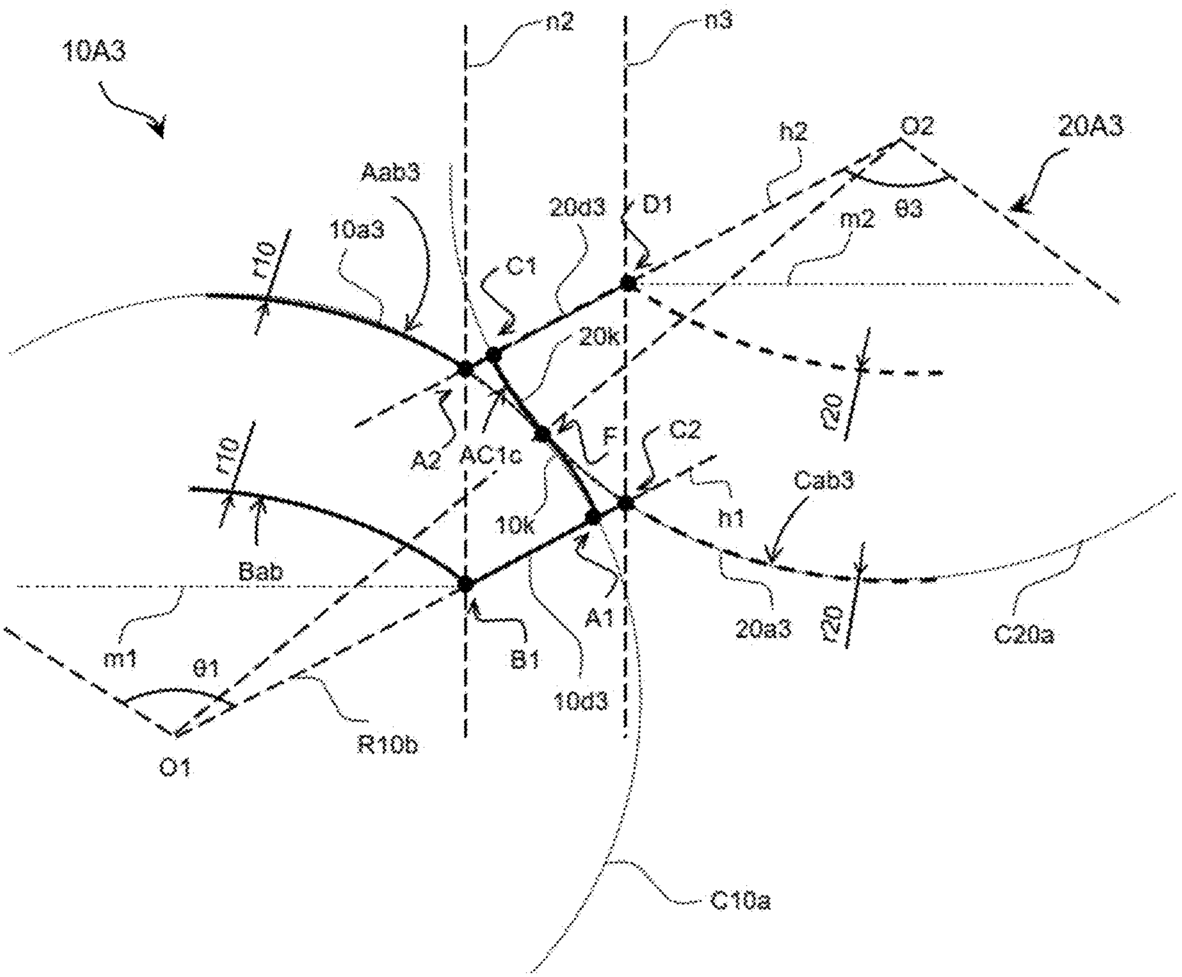
FIG. 6C is a diagram showing a configuration example of an end portion of an outer arc edge of a segment according to Example 3 of the second embodiment.

Next, in Example 3 shown in FIG. 6C, adjacent segments 10A3 and 20A3 have a common end portion of the outer arc edges. The segment 10A3 includes an endpoint C1 located on the segment 20A3, and the segment 20A3 includes an endpoint A1 located on the segment 10A3. The segment 10A3 has a side edge 10*d*3 defined by the endpoint B1 and A1, and the segment 20A3 has a side edge 20*d*3 defined by the endpoint D1 and C1. In this case, segments 10A3 and 20A3 have a common inflection arc edge section AC1*c*. Inflection arc edge section AC1*c* is formed by a second arcuate section 10*k* on the circumference of the circle C10*a* and a third arcuate section 20*k* on the circumference of the circle C20*a*. The second arcuate section 10*k* and the third arcuate section 20*k* are in contact at the inflection point F. The inflection arc edge section AC1*c* is defined by a curve connecting the endpoints C1 and A1, and the curve changes direction at the inflection point F, such that the third arcuate section 20*k* between the endpoint C1 and the inflection point F and the second arcuate section 10*k* between the inflection point F and the endpoint A1 have opposite curvature directions, as shown.

Figure 6D:
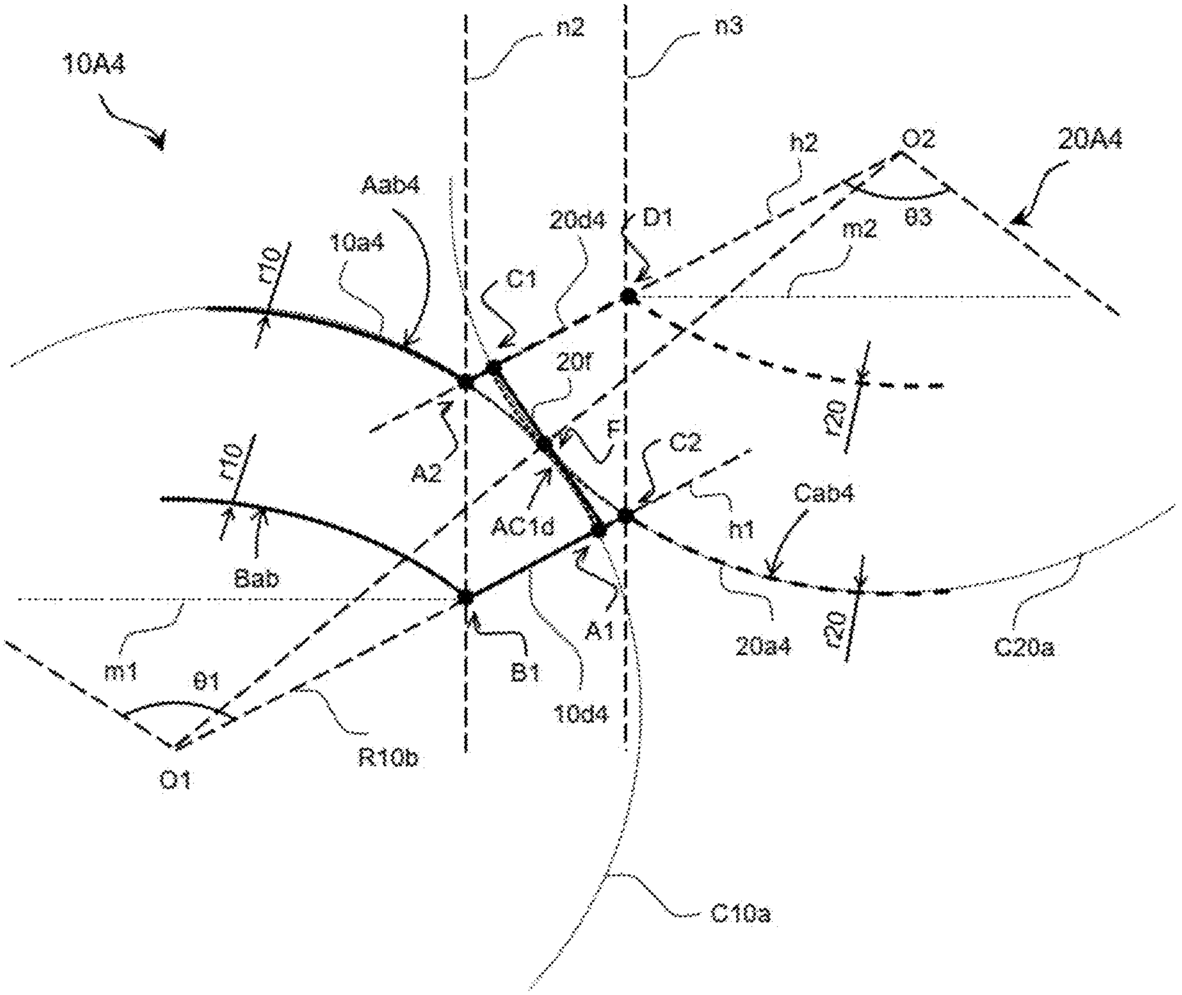
FIG. 6D is a diagram showing a configuration example of an end portion of an outer arc edge of a segment according to Example 4 of the second embodiment.

Next, in Example 4 shown in FIG. 6D, similar to Example 3, a common end portion of the outer arc edges is formed between adjacent segments 10A4 and 20A4. The segment 10A4 includes an endpoint C1 located on the segment 20A4, and the segment 20A4 includes an endpoint A1 located on the segment 10A4. The segment 10A4 has a side edge 10*d*4 defined by the endpoints B1 and A1, and the segment 20A4 has a side edge 20*d*4 defined by the endpoints D1 and C1. In this case, segments 10A4 and 20A4 have a common rectilinear section AC1*d*. The rectilinear section AC1*d* is formed by a straight line 20*f* connecting the endpoints C1 and A1, and the straight line 20*f* substantially passes through the inflection point F.

The above inflection arc edge sections AC1*a*, AC1*c* or rectilinear sections AC1*b*, AC1*d* can be applied, for example, to the outer arc edge Aab near one or both of the side edges 10*c* and 10*d* of the arched segment 10A shown in FIG. 3A. The inflection arc edge sections AC1*a*, AC1*c* or rectilinear sections AC1*b*, AC1*d* can also be applied to the outer arc edge Aab1 near the side edge 10*d* of the partially arched segment 10B shown in FIG. 3B. Further, for the outer arc edge Aab on both sides of the arched segment 10A, similar inflection arc edge sections or rectilinear sections may be applied, or any two different ones of the inflection arc edge sections and rectilinear sections may be applied.

FIG. 7 shows an example of the segment 10A5 having different inflection arc edge sections at the outer arc edge near side edges on both sides. As shown in the figure, near a side edge 10*c*5 of the segment 10A5, a circle of curvature C10*a*5 of the first arcuate section 10*a*5 of the segment 10A5 is externally tangent to a circle C30*a* with a radius of curvature r30A at an inflection point Fa. Near the other side edge 10*d*5 of the segment 10A5, the circle of curvature C10*a*5 of the first arcuate section 10*a*5 is externally tangent to a circle C30*b* with the radius of curvature r30A at an inflection point Fb. The outer arc edge Aab5 of the segment 10A5 is configured to have an inflection arc edge section ACa including an endpoint C2*a* located on the circle C30*a* near the side edge 10*c*5, and an inflection arc edge section ACb including an endpoint C1*b* located on the circle C30*b* near the side edge 10*d*5. Here, the inflection arc edge section ACa can be formed in the same manner as the inflection arc edge section AC1*a* shown in FIG. 6A, and the inflection arc edge section ACb can be formed in the same manner as the inflection arc edge section AC1*c* shown in FIG. 6C. The segment 10A5 thus configured has an outer arc edge that is slightly asymmetric with respect to the center line n. The outer arc edge of the arched segment according to the present disclosure is not limited to the configuration example shown in FIG. 7. For example, the outer arc edges near the side edges on both sides of the arched segment can be formed by a combination of any two of the inflection arc edge sections AC1*a*, AC1*c* and the rectilinear sections AC1*b*, AC1*d*.

In order to reduce the surface reflection of light of a certain wavelength, the wavelength conversion element may be provided with an anti-reflection coating on one surface of the segments constituting the wavelength conversion element. By configuring the outer arc edge of the segment in a slightly asymmetric shape, the surface with the anti-reflection coating can be easily identified, which is convenient when constructing a wavelength conversion wheel.

FIG. 8 shows a simplified view of adjacent segment rows 110B, 120B, and 130B on a plate-shaped sintered substrate 30. As shown in the figure, the arched segment rows 110B, 120B, and 130B arranged in opposite directions with their side edges in contact with each other have generally similar shapes, but are configured in different sizes. Also, as shown in the enlarged view, in the end region S2 where the adjacent segment rows are in contact, the outer arc edge 122*a* of the arched segment 122B and the outer arc edge 132*a* of the adjacent arched segment 132B include an inflection arc edge section or a rectilinear section (not shown) at the end where they are in contact with each other, thereby forming a common end portion of the outer arc edges. This allows for separating the segments of the adjacent segment rows along a common breaking line, thereby reducing the cutting distance for separating individual segments.

In this manner, by forming a common end portion of the outer arc edges including an inflection arc edge section or a rectilinear section on the arched segment or the partially arched segment, the segments of the adjacent segment rows can be cut along a common breaking line, and the cutting distance for separating individual segments can be reduced, thereby improving production efficiency and yield. Furthermore, it becomes possible to simultaneously manufacture segments with similar shapes but having different sizes on a single plate-shaped sintered substrate, thereby improving productivity and enabling flexible production of various light sources or projector devices.

The arched segments or partially arched segments of the present disclosure can be used to configure, for example, wavelength conversion wheels for projection-type image display devices. The configuration of a wavelength conversion wheel 1 according to a third embodiment will be described below with reference to FIGS. 9 to 10D.

<Configuration of Wavelength Conversion Wheel>

Third Embodiment

Figure 9:
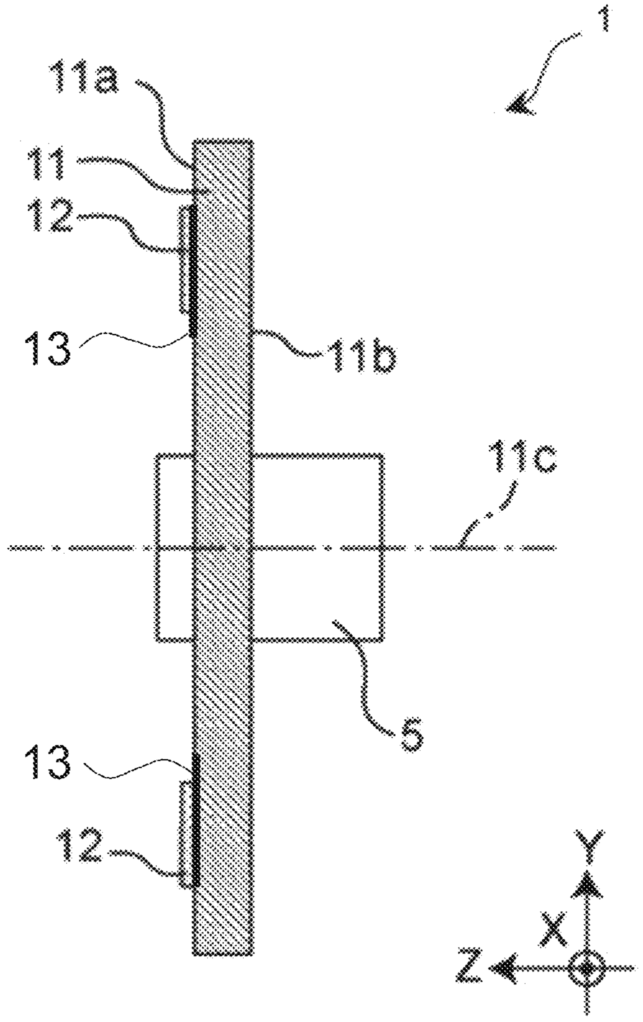
FIG. 9 is a side view showing a configuration example of a wavelength conversion wheel according to a third embodiment of the present disclosure.

FIG. 9 is a side view showing a configuration example of the wavelength conversion wheel 1 according to a third embodiment of the present disclosure. FIGS. 10A to 10D are schematic plan views showing planar configuration examples of the wavelength conversion wheels 1A to 1D according to Examples 1 to 4 of the third embodiment and variants (FIGS. 10A1 and 10B1) of Examples 1 and 2. In each figure, the plane in which the wavelength conversion wheel receives excitation light is the XY plane, and the direction orthogonal to the XY plane is the Z direction. In FIG. 9, the configuration in the common YZ plane of the wavelength conversion wheels 1A-1D shown in FIGS. 10A to 10D is described as the wavelength conversion wheel 1.

As shown in FIG. 9, the wavelength conversion wheel 1 includes a base plate 11, a wavelength conversion element 12 disposed on the base plate 11, and a motor 5 for rotating the base plate 11. The wavelength conversion wheel 1 of this embodiment, for example, can be used as a wavelength conversion wheel for a projection-type image display device.

The base plate 11 is made of, for example, aluminum, and has a first main surface 11*a* and a second main surface 11*b*. The base plate 11 has, for example, a disk shape that can be rotated about an axis 11*c* of the base plate 11. The wavelength conversion element 12 is disposed on the first main surface 11*a* of the base plate 11. For example, the motor 5 is attached to the second main surface 11*b* of the base plate 11. Further, a reflective layer can be formed on the first main surface 11*a* of the base plate 11, and the reflective layer may be capable of reflecting light in the wavelength band of the excitation light and light in the wavelength band of the wavelength-converted light generated by the excitation light.

The motor 5 rotates the disk-shaped base plate 11 around the axis 11*c*, thereby suppressing the temperature rise in the wavelength conversion element 12 caused by the excitation light, and making it possible to maintain a stable wavelength conversion efficiency.

The wavelength conversion element 12 includes a wavelength conversion material such as a phosphor that is excited by incident light and generates light of a wavelength different from that of the incident light. In the present embodiment, for example, inorganic phosphor particles can be used as the wavelength conversion material. The phosphor used as the wavelength conversion material is not limited as long as it generates fluorescence in response to the irradiation of excitation light. For example, an oxide phosphor, a nitride phosphor, an oxynitride phosphor, a sulfide phosphor, a garnet compound phosphor, etc. can be used as the wavelength conversion material.

The wavelength conversion element 12 is fixed on the first main surface 11*a* of the base plate 11 by an adhesive layer 13. The adhesive layer may be a mixed layer in which a heat-resistant resin such as silicone or silsesquioxane is filled with particles having high reflectivity. In this case, it also functions as a reflective layer simultaneously. It may also be a mixed layer in which a heat-resistant resin such as silicone or silsesquioxane is filled with particles having high thermal conductivity. In this case, it also functions as a heat transfer layer simultaneously, helping to suppress the temperature rise of a wavelength conversion material, such as a phosphor. It may also be a mixture of both high reflectivity and high thermal conductivity particles, or it may be a heat-resistant resin such as silicone or silsesquioxane that does not contain particles with reflectivity or thermal conductivity.

In this embodiment, the wavelength conversion element 12 is composed of either an arched segment or a partially arched segment according to the first or second embodiment. The wavelength conversion wheel 1 can include a plurality of wavelength conversion elements, and the plurality of wavelength conversion elements can include a wavelength conversion material that is excited by incident light and generates light of different wavelengths. In this embodiment, as shown in FIGS. 10A to 10D, the plurality of arched or partial arched wavelength conversion elements are arranged around the axis 11*c* of the base plate 11, with the concave side facing the inside of the base plate 11. The wavelength conversion element can be composed of segments with different shapes or central angles, and the number of wavelength conversion elements used can be changed depending on the intended uses.

Figure 10A:
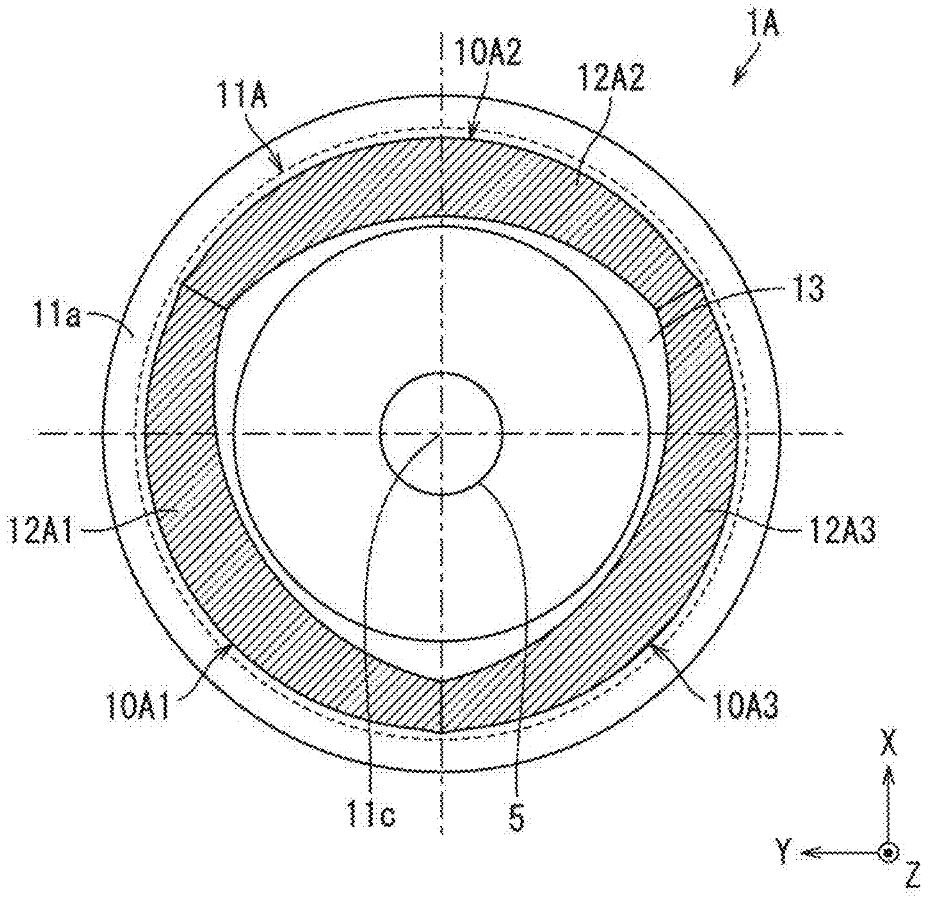
FIG. 10A is a schematic plan view showing a planar configuration example of a wavelength conversion wheel according to Example 1 of the third embodiment.

A wavelength conversion wheel 1A of Example 1 shown in FIG. 10A includes wavelength conversion elements 12A1, 12A2, and 12A3, and the wavelength conversion elements 12A1, 12A2, and 12A3 are composed of arched segments. The first arcuate sections 10A1, 10A2, and 10A3 of the arched segments are arranged along a circumference 11A at the same distance from the axis of the base plate 11, and the wavelength conversion elements 12A1, 12A2, and 12A3 are arranged in a ring shape as a whole. The circumference at the same distance from the axis of the base plate 11 passes through the ends of the wavelength conversion elements, and adjacent wavelength conversion elements are arranged so as to be in contact with each other at the ends. The wavelength conversion elements 12A1, 12A2, and 12A3 arranged in a ring shape form an annular excitation light focusing area.

In a projection-type image display device, the wavelength conversion elements are arranged axially symmetrically in a ring shape as a whole along a circumference with the first arcuate section at the same distance from the axis of the base plate, thereby suppressing vibration of the wheel during rotation due to imbalance and stabilizing the wavelength conversion wheel. The present disclosure is not limited to the boundary line at the ends where adjacent wavelength conversion elements contact each other, and the ends where adjacent wavelength conversion elements contact each other may have a straight boundary line or a curved boundary line.

In FIG. 10A, the arched segments constituting the wavelength conversion elements 12A1, 12A2, and 12A3 are shown as the arched segments 10A in the basic shape according to the first embodiment (FIG. 3A) of the present disclosure, but the present disclosure is not limited thereto. For example, FIG. 10A1 is a schematic plan view showing a planar configuration example of a wavelength conversion wheel 1Aa according to a variant of Example 1 shown in FIG. 10A. The wavelength conversion elements 12Aa1, 12Aa2, and 12Aa3 of the wavelength conversion wheel 1Aa in FIG. 10A1 can be configured, for example, with any of the arched segments 10A1 to 10A5 each having an outer arc edge including an inflection arc edge section or a rectilinear section according to the second embodiment of the present disclosure (FIGS. 6A to 7). As shown in the figure, the wavelength conversion elements 12Aa1, 12Aa2, and 12Aa3 are generally arranged in a ring shape along a circumference 11A in which the first arcuate sections 10Aa1, 10Aa2, and 10Aa3 are at the same distance from the axis of the base plate 11, but an endpoint C1A at the outer arc edge including an inflection arc edge section or a rectilinear section slightly protrudes from the circumference 11A. In this manner, the wavelength conversion elements 12Aa1, 12Aa2, and 12Aa3 including the endpoint C1A slightly protruding from the circumference 11A can configure the wavelength conversion wheel 1Aa with overall rotational symmetry.

Figure 10B:
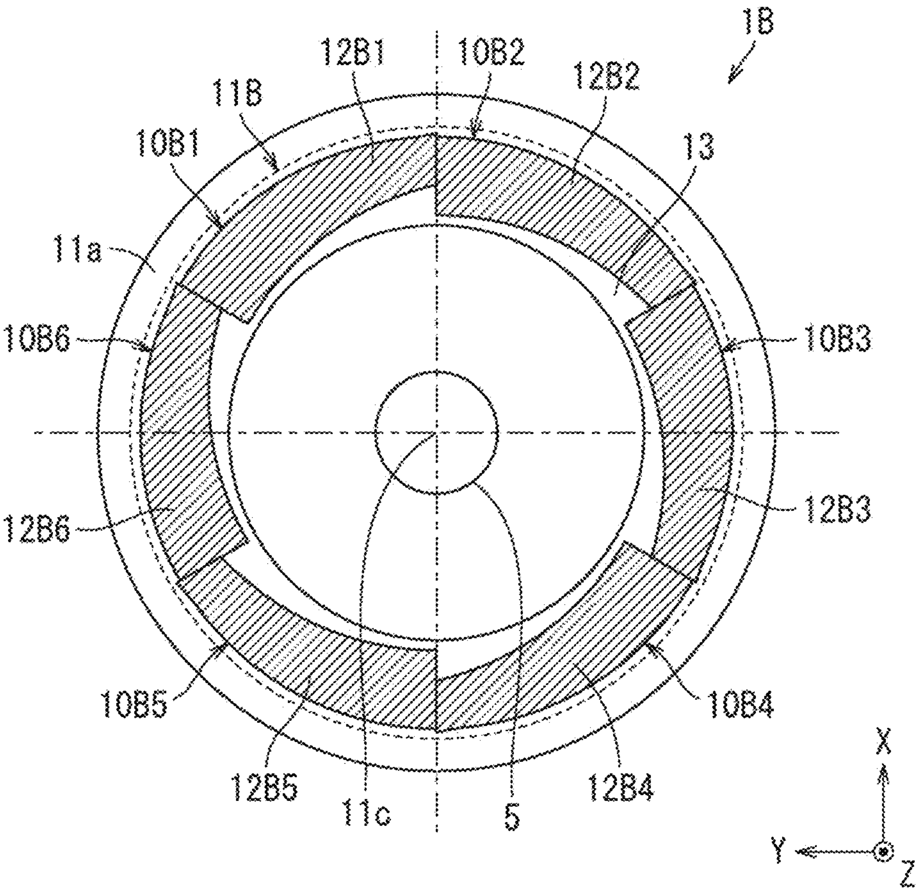
FIG. 10B is a schematic plan view showing a planar configuration example of a wavelength conversion wheel according to Example 2 of the third embodiment.

A wavelength conversion wheel 1B of Example 2 shown in FIG. 10B includes wavelength conversion elements 12B1 to 12B6, and the wavelength conversion elements 12B1 to 12B6 are composed of partially arched segments. The partially arched segments are arranged in a ring shape as a whole along a circumference 11B where the first arcuate sections 10B1 to 10B6 are at the same distance from the axis of the base plate 11. The circumference at the same distance from the axis of the base plate 11 passes through the ends of the wavelength conversion elements, and the adjacent wavelength conversion elements are arranged to be in contact with each other at the ends. The wavelength conversion elements 12B1 to 12B6 arranged in a ring shape form an annular excitation light irradiation region. In Example 2, the partially arched segments constituting adjacent wavelength conversion elements are arranged to be in contact at the ends where the radial width of the circumference 11B is different, but the present disclosure is not limited thereto. The partially arched segments constituting adjacent wavelength conversion elements may be in contact at the ends having different radial widths, or may be arranged to be in contact at the ends having substantially the same radial width. The ends of adjacent wavelength conversion elements in contact with each other may have a straight boundary line or a curved boundary line.

In FIG. 10B, the partially arched segments constituting the wavelength conversion elements 12B1 to 12B6 are shown as partially arched segments 10B in the basic shape according to the first embodiment of the present disclosure (FIG. 3B), but the present disclosure is not limited thereto. For example, FIG. 10B1 is a schematic plan view showing a planar configuration example of a wavelength conversion wheel 1Ba according to a variant of Example 2 shown in FIG. 10B. The wavelength conversion elements 12Ba1 to 12Ba6 of the wavelength conversion wheel 1Ba in FIG. 10B1 can be composed of any of the partially arched segments 10A1 to 10A5 each having an outer arc edge including an inflection arc edge section or a rectilinear section according to the second embodiment of the present disclosure (FIGS. 6A to 7). As shown in the figure, the wavelength conversion elements 12Ba1 to 12Ba6 are arranged in a ring shape as a whole along a circumference 11A in which the first arcuate sections 10Ba1-10Ba6 are at the same distance from the axis of the base plate 11, but an endpoint C1B at the outer arc edge including an inflection arc edge section or a rectilinear section slightly protrude from the circumference 11A. In this manner, the wavelength conversion elements 12Ba1 to 12Ba6 including the endpoint C1B slightly protruding from the circumference 11A can configure the wavelength conversion wheel 1Ba with overall rotational symmetry.

The wavelength conversion wheel shown in FIGS. 10A and 10A1 or 10B and 10B1 includes a plurality of wavelength conversion elements arranged adjacent to each other in a ring shape, and thus continuous wavelength-converted light can be obtained with irradiation of incident excitation light. The wavelength conversion elements of the wavelength conversion wheel can also be configured by a combination of the arched segment and the partially arched segment according to the present disclosure (not shown).

The wavelength conversion elements arranged in a ring shape as a whole may include a missing part of the ring shape. For example, in a one-chip type DLP projector, RGB color lights are used in a time-division manner. In this type of projector, it is not necessary to output wavelength-converted light all the time, and blue light used for the excitation light may be also used as the illumination light. In this case, a wavelength conversion wheel composed of wavelength conversion elements can be arranged in a ring shape including a missing part.

Figure 10C:
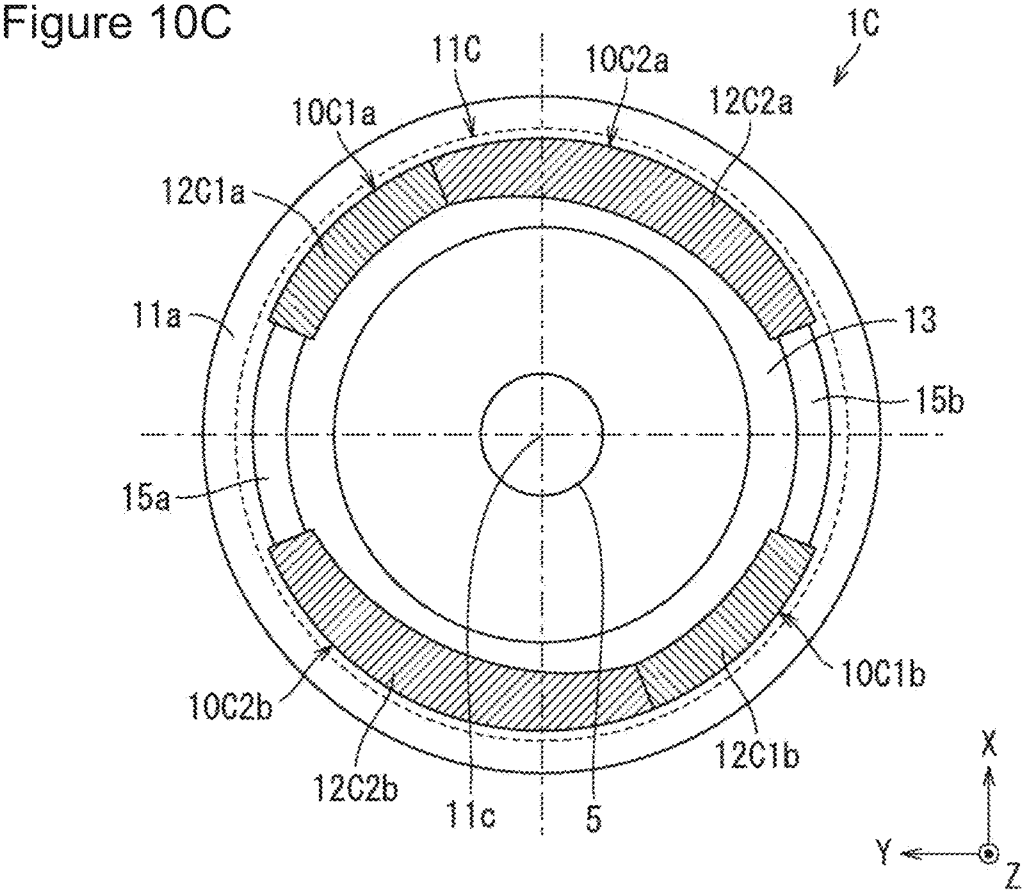
FIG. 10C is a schematic plan view showing a planar configuration example of a wavelength conversion wheel according to Example 3 of the third embodiment.

A wavelength conversion wheel 1C of Example 3 shown in FIG. 10C is configured to have first wavelength conversion elements 12C1*a*, 12C1*b* and second wavelength conversion elements 12C2*a*, 12C2*b*. The first wavelength conversion elements 12C1*a*, 12C1*b* and the second wavelength conversion elements 12C2*a*, 12C2*b* are arranged in a ring shape as a whole, with the first arcuate sections 10C1*a*, 10C1*b*, 10C2*a*, and 10C2*b* of the respective arched segments being arranged along a circumference 11C at the same distance from the axis of the base plate 11. The first wavelength conversion elements 12C1*a*, 12C1*b* include a first wavelength conversion material that converts the wavelength of the excitation light into light of a first wavelength, and the second wavelength conversion elements 12C2*a*, 12C2*b* include a second wavelength conversion material that converts the wavelength of the excitation light into light of a second wavelength.

In this embodiment, as shown in the figure, a first wavelength conversion element 12C1*a* and the second wavelength conversion element 12C2*a* are arranged so as to be in contact with each other at one end, and the first wavelength conversion element 12C1*b* and the second wavelength conversion element 12C2*b* are arranged so as to be in contact with each other at one end. The other end of the first wavelength conversion element 12C1*a* and the second wavelength conversion element 12C2*b*, and the other end of the second wavelength conversion element 12C2*a* and the first wavelength conversion element 12C1*b* are not in contact with each other, and thus a missing part of the ring shape is formed. The base plate 11 includes openings 15*a* and 15*b* corresponding to the missing parts of the wavelength conversion elements. As shown in FIG. 10C, the wavelength conversion elements 12C1*a*, 12C1*b*, 12C2*a*, and 12C2*b* arranged in a ring shape with a missing part, and the openings 15*a* and 15*b* together form an annular excitation light irradiation area, and excitation light can pass through the openings 15*a* and 15*b*.

In the configuration example shown in FIG. 10C, two openings are disposed, but the present disclosure is not limited thereto. The opening may be one or more. The first wavelength conversion elements 12C1*a*, 12C1*b* and the second wavelength conversion elements 12C2*a*, 12C2*b* may be configured by any of the arched segments or the partially arched segments according to the above first or second embodiment. Each wavelength conversion element may be configured by segments with similar shapes or central angles, or may be configured by segments with different shapes or central angles.

Figure 10D:
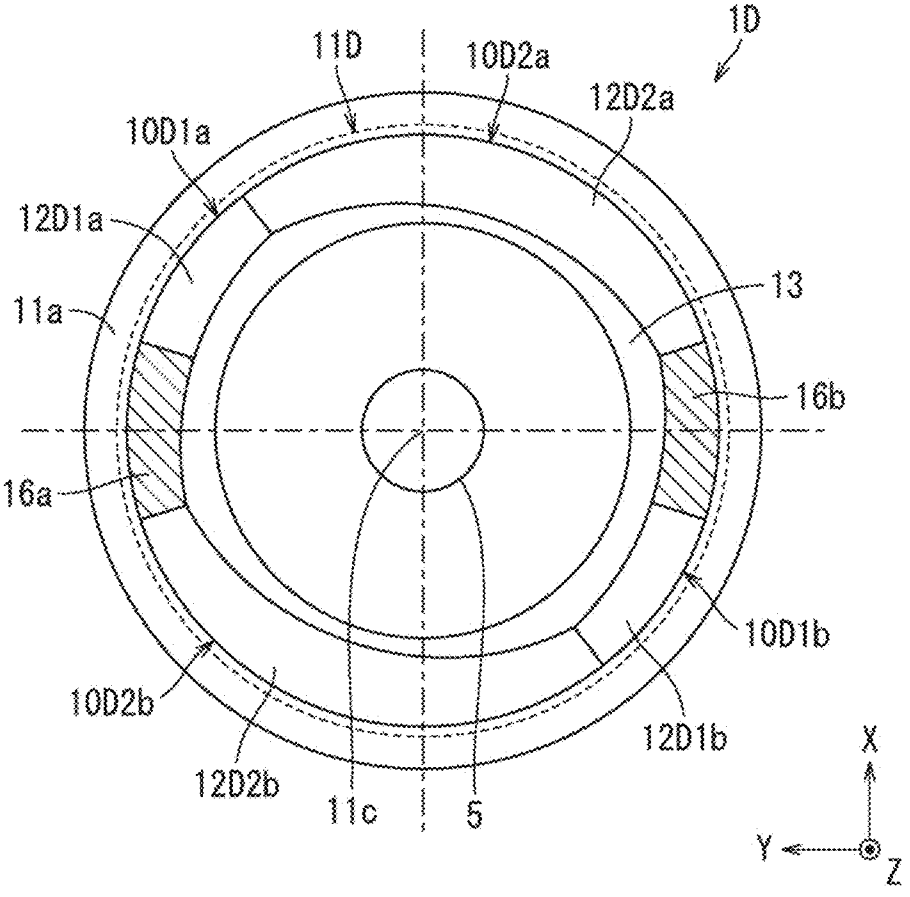
FIG. 10D is a schematic plan view showing a planar configuration example of a wavelength conversion wheel according to Example 4 of the third embodiment.

A wavelength conversion wheel 1D of Example 4 shown in FIG. 10D is configured to include first wavelength conversion elements 12D1*a*, 12D1*b* and second wavelength conversion elements 12D2*a*, 12D2*b*. The first wavelength conversion elements 12D1*a*, 12D1*b* include a first wavelength conversion material that converts the excitation light into light of a first wavelength, and the second wavelength conversion elements 12D2*a*, 12D2*b* include a second wavelength conversion material that converts the excitation light into light of a second wavelength.

As shown in FIG. 10D, in comparison with the wavelength conversion wheel 1C of Example 3, the wavelength conversion wheel 1D is different in that, instead of the openings 15*a* and 15*b* of the wavelength conversion wheel 1C, the wavelength conversion wheel 1D includes reflective areas 16*a* and 16*b*. As shown in the figure, the wavelength conversion elements 12D1*a*, 12D2*a*, 12D1*b*, and 12D2*b* are arranged adjacent to each other in a ring shape. A reflection layer is applied to a portion of the wavelength conversion elements 12D1*a* and 12D1*b* in the ring shape to form the reflective areas 16*a* and 16*b*. The excitation light can be reflected in the reflective areas 16*a* and 16*b*.

The first wavelength conversion elements 12D1*a*, 12D1*b* constituting the wavelength conversion wheel 1D may include a first wavelength conversion material that converts the excitation light into light of a first wavelength, and the second wavelength conversion elements 12D2*a*, 12D2*b* may include a second wavelength conversion material that converts the excitation light into light of a second wavelength. In the configuration example shown in FIG. 10D, two reflective areas are disposed, but the present disclosure is not limited thereto. The reflective area may be one or more. Further, the first wavelength conversion elements 12D1*a*, 12D1*b* and the second wavelength conversion elements 12D2*a*, 12D2*b* may be configured by any of the arched segments or the partially arched segments according to the above first or second embodiment. Each wavelength conversion element may be configured by segments with similar shapes or central angles, or may be configured by segments with different shapes or central angles.

Although not shown in FIG. 10D, the wavelength conversion elements constituting the wavelength conversion wheel 1D may be arranged in a ring shape with a missing part. In this case, the reflective areas 16*a* and 16*b* may be formed by applying a reflection layer to the first main surface 11*a* of the base plate 11 at a position corresponding to the missing part of the ring shape.

In FIG. 10D, the reflective areas 16*a* and 16*b* are shown to be disposed at substantially the same positions as the openings 15*a* and 15*b* of the wavelength conversion wheel 1C of Example 3, but the present disclosure is not limited thereto. The reflective area may be one or more. The first wavelength conversion elements 12D1*a*, 12D1*b* and the second wavelength conversion elements 12D2*a*, 12D2*b* can be configured by either the arched segments or the partially arched segments according to the above first or second embodiment. Each wavelength conversion element may be configured by segments with similar shapes or central angles, or may be configured by segments with different shapes or central angles.

According to the wavelength conversion wheels 1A to 1D of Examples of the third embodiment and the wavelength conversion wheels 1Aa and 1Ba of the variants of the Examples, by using wavelength conversion elements constituted by the arched segments or the partially arched segments according to the first or second embodiment, it is possible to improve production efficiency and yield.

<Configurations of Light Source Device and Projection-Type Image Display Device>

Fourth Embodiment

Figure 11:
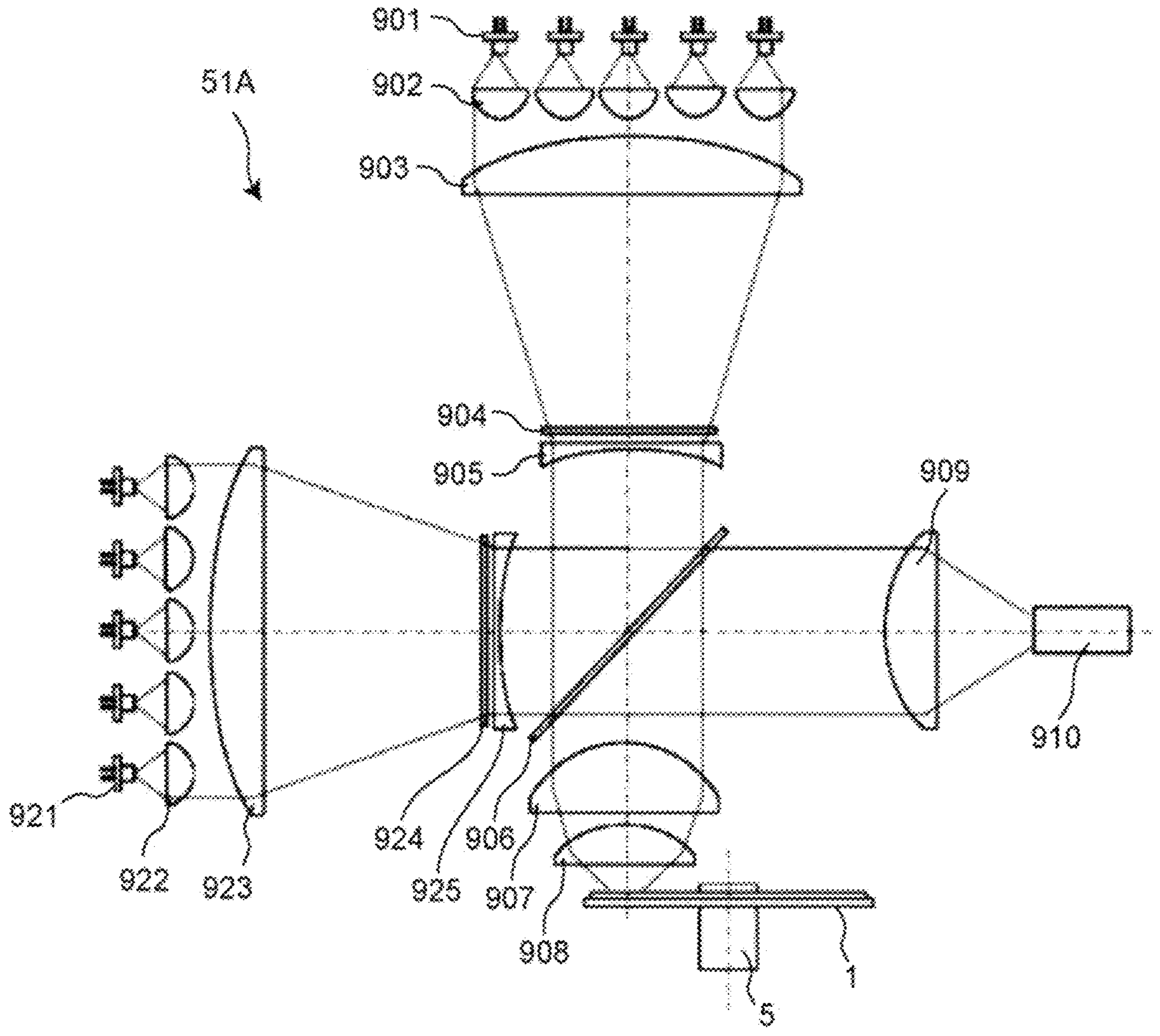
FIG. 11 is a diagram illustrating a configuration example of a light source device according to a fourth embodiment of the present disclosure.
Figure 12:
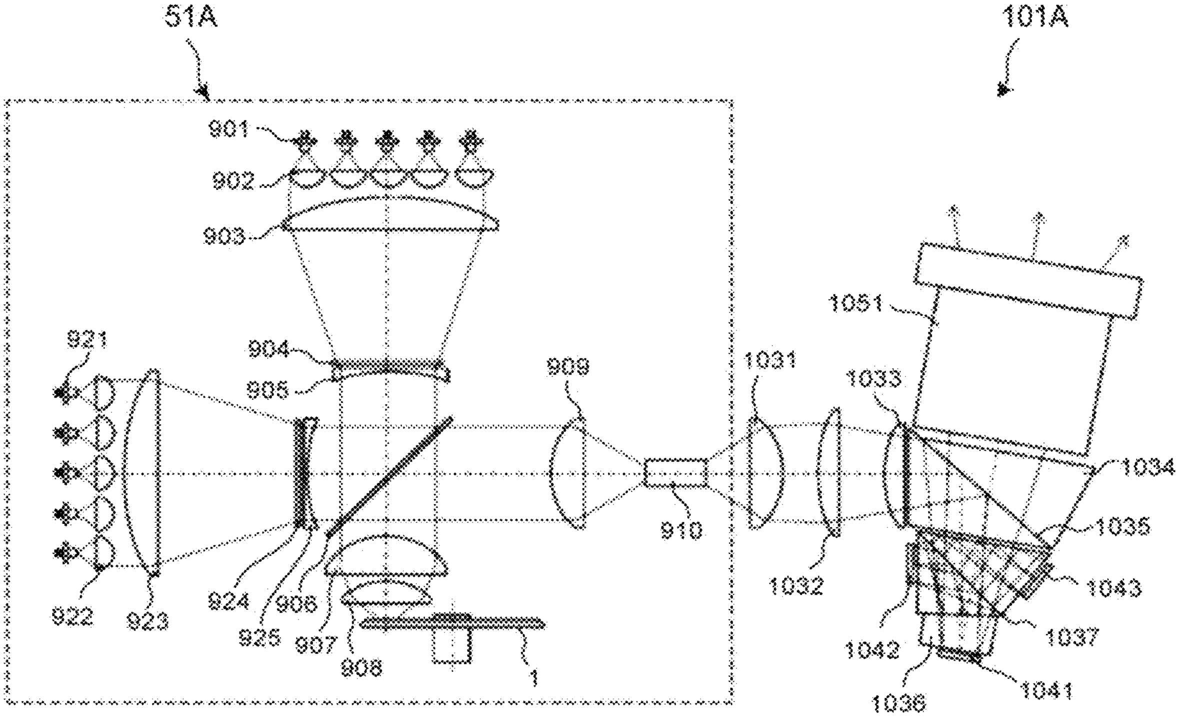
FIG. 12 is a diagram showing a configuration example of a projection-type image display device including the light source device shown in FIG. 11.

The configurations of the light source device and the projection-type image display device according to a fourth embodiment will hereinafter be described with reference to FIGS. 11 and 12. FIG. 11 is a diagram showing a configuration example of a light source device 51A according to the fourth embodiment of the present disclosure. FIG. 12 is a diagram showing a configuration example of a projection-type image display device 101A including the light source device 51A shown in FIG. 11.

The fourth embodiment relates to a light source device 51A including the wavelength conversion wheel 1A, 1Aa or the wavelength conversion wheel 1B, 1Ba of the third embodiment, and the projection-type image display device 101A including the light source device 51A. In the following description, the wavelength conversion wheel of the light source device 51A will be described as the wavelength conversion wheel 1. Detailed description of the wavelength conversion wheel 1 will be omitted.

The light source device 51A of the fourth embodiment can be used, for example, in a three-chip projection-type image display device. As shown in FIG. 11, laser light in the blue wavelength range emitted from a plurality of laser light sources 901 is collimated by a plurality of collimator lenses 902 disposed corresponding to each of the laser light sources 901. The collimated blue light then enters the convex lens 903, where the light beam width is narrowed, and then enters the diffusion plate 904, where the light uniformity is improved. The blue light output from the diffuser plate 904 is then collimated by the concave lens 905.

The blue light collimated by the concave lens 905 is incident on a splitting mirror 906 arranged at an angle of approximately 45 degrees with respect to the optical axis, and then enters the convex lens 907 without changing the traveling direction. The splitting mirror 906 has spectral characteristics that allow light in the wavelength range of blue light emitted from the laser light source 901 and the laser light source 921 to pass through while reflect light in the wavelength range of wavelength-converted light generated by the wavelength conversion wheel 1 by the excitation of the blue light from the laser light source 901.

Here, the splitting mirror 906 has spectral characteristics according to the wavelength of the blue light from the laser light source and that of the wavelength-converted light obtained from the wavelength conversion wheel, but the present disclosure is not limited thereto. For example, the mirror 906 may have spectral characteristics according to the polarization direction of the laser light source. By adjusting the blue light from the laser light source to have the same polarization direction, it is possible to allow blue light with a specific polarization direction from the laser light source to pass through and reflect light of the wavelength-converted light obtained from the wavelength conversion wheel.

The blue light passes through the convex lenses 907, 908 and is directed to a ring-shaped excitation light irradiation region (refer to FIGS. 10A and 10B) formed by the wavelength conversion element 12 in the wavelength conversion wheel 1. The wavelength conversion wheel 1 includes the motor 5 and is arranged so that the blue excitation light focused by the convex lenses 907, 908 is incident on the wavelength conversion element 12 arranged in a ring shape around the axis of the wavelength conversion wheel 1.

The blue light incident on the wavelength conversion element 12 of the wavelength conversion wheel 1 is wavelength converted, changes the traveling direction by 180 degrees, then enters the convex lenses 907, 908 again, and is output as parallel light. The wavelength region of the wavelength-converted light here is optimized so as to for example, generate white light in combination with blue light emitted from the laser light source 921. The laser light source 921 will be described later.

The paralleled wavelength-converted light output from the convex lens 907 is incident on the splitting mirror 906 in the opposite direction. As described above, the splitting mirror 906 has the characteristics of reflecting light in the wavelength range of the wavelength-converted light. Thus, the wavelength-converted light changes the traveling direction by 90 degrees and is incident on the convex lens 909.

On the other hand, laser light in the blue wavelength range emitted from the plural laser light sources 921 is collimated by plural collimator lenses 922 arranged corresponding to each of the laser light sources 921. The collimated blue light enters the convex lens 923, where the light beam width is narrowed, and then enters the diffusion plate 924 where the light uniformity is improved. The blue light output from the diffusion plate 924 is then collimated by the concave lens 925.

The blue light output from the concave lens 925 then enters the splitting mirror 906. The splitting mirror 906 is tilted approximately 45 degrees with respect to the optical axis, and allows light in the wavelength range of blue light emitted from the laser light source 921 to pass through. Then the blue light passes and enters the convex lens 909 without changing the traveling direction.

The wavelength-converted light from the wavelength conversion wheel 1 and the blue light from the laser light source 921 output from the convex lens 909 are focused and enter a rod integrator 910, which has an incident end disposed approximately at the focusing position of the convex lens 909. The light with uniformed flux is output from the exit end of the rod integrator 910.

In the fourth embodiment shown in FIG. 11, the splitting mirror 906 is arranged at an angle of approximately 45 degrees with respect to the optical axis. However, according to incident angle dependence of the spectral characteristics of the splitting mirror, the angle of the splitting mirror 906 with respect to the optical axis may be an angle different from approximately 45 degrees. In that case, other components may be arranged accordingly.

In addition, in FIG. 11, the splitting mirror 906 has been described as having the characteristics of transmitting light in the wavelength range of blue light and reflecting light in the wavelength range of wavelength-converted light. Alternatively, the splitting mirror may also have the characteristics of reflecting light in the wavelength range of blue light and transmitting light in the wavelength range of wavelength-converted light. Then other components may be arranged accordingly.

Further, the laser light from the laser light source 901 may be light in the ultraviolet region instead of light in the blue wavelength region. In that case, the characteristics of the splitting mirror 906 and the arrangement of other components may be adjusted according to the wavelength region of the laser light from the laser light source 901.

Referring to FIG. 12, configuration of a projection-type image display device 101A including a light source device 51A that uses a wavelength conversion wheel 1 will be described below. The projection-type image display device 101A of this embodiment is a so-called three-chip type projection-type image display device.

The light output from rod integrator 910 is then incident on a light modulation device composed of digital micromirror devices (DMDs) 1041, 1042, and 1043 by a relay lens system composed of convex lenses 1031, 1032, and 1033.

The light output from the relay lens system composed of convex lenses 1031, 1032, and 1033 enters a total reflection prism 1034 including a micro gap 1035. The light entering the total reflection prism 1034 at an angle equal to or greater than the total reflection angle is reflected by the micro gap 1035, changing the traveling direction, and enters a color prism 1036 composed of three glass blocks with a micro gap 1037.

The wavelength-converted light from the wavelength conversion wheel 1 and the blue light from the laser light source 921 that enters the first glass block of the color prism 1036 from the total reflection prism 1034 is first reflected by a reflective layer having blue reflection characteristics disposed in front of the micro gap 1037. Then the blue light changes the traveling direction, travels toward the total reflection prism, and is incident on the micro gap disposed between the total reflection prism 1034 and the color prism 1036 at an angle greater than the total reflection angle, then enters the DMD 1043 for blue color light.

Next, the red light of the wavelength-converted light passing through the micro gap 1037 is reflected by a reflective layer disposed between the second and third glass blocks of the color prism 1036. The reflective layer has spectral characteristics that reflect light in the red wavelength region while allow green light to pass through. Then the red light changes the traveling direction and travels back toward the first glass block.

The red light is reflected again by the micro gap 1037 disposed between the first and second glass blocks of the color prism 1036, changing the traveling direction, and then enters the DMD 1042 for red color light.

The green light of the wavelength-converted light passing through the micro gap 1037 further passes through the reflective layer disposed between the second and third glass blocks of the color prism and has spectral characteristics that reflect light in the red wavelength region while allow green light to pass through. Then the green light proceeds toward the third glass block, and enters the DMD 1041 for green color light.

The DMDs 1041, 1042, and 1043 change the traveling direction of incident light by changing the angle of the micromirror for each pixel in response to an image signal for each color received from an image circuit (not shown).

The green light, with the traveling direction changed by the green DMD 1041 in response to an image signal, enters the third glass block of the color prism 1036 and passes through the reflective layer disposed between the third and second glass blocks of the color prism 1036.

The red light, with the traveling direction changed by the red DMD 1042 in response to an image signal, enters the second glass block of the color prism 1036 and is reflected by being incident on the micro gap 1037 at an angle equal to or greater than the total reflection angle. The red light changed the traveling direction then travels toward the third glass block of the color prism, reflected by the reflective layer disposed between the second and third glass blocks of the color prism 1036, changing the traveling direction again and getting combined with the green light.

The light combined at the reflective layer travels toward the first glass block of the color prism 1036, and is incident on the micro gap 1037 at an angle less than the total reflection angle and thus passes through.

The blue light, with the traveling direction changed by the blue DMD 1043 in response to the image signal, enters the first glass block of the color prism 1036, travels toward the total reflection prism 1034, and is incident on the gap between the total reflection prism 1034 and the color prism 1036 at an angle equal to or greater than the total reflection angle and then travels toward the second glass block of the color prism 1036. The blue light is then reflected by the reflective layer disposed on the first glass block side in front of the micro gap 1037, changing the traveling direction, and travels toward the total reflection prism 1034, getting combined with the green light from the green DMD 1041 and red light from the red DMD 1042. The combined light then enters the total reflection prism 1034.

The incident light from the DMDs 1041, 1042, and 1043 passes through the total reflection prism 1034, and is projected onto a projection target (not shown) via a projection lens 1051 that serves as a projection optical system.

According to the light source device 51A and the projection-type image display device 101A of the fourth embodiment, the production efficiency and yield can be improved by using the wavelength conversion wheel 1A or 1Aa (refer to FIGS. 10A and 10A1) composed of the arched segments, or the wavelength conversion wheel 1B or 1Ba (refer to FIGS. 10B and 10B1) composed of the partially arched segments.

Fifth Embodiment

Figure 13:
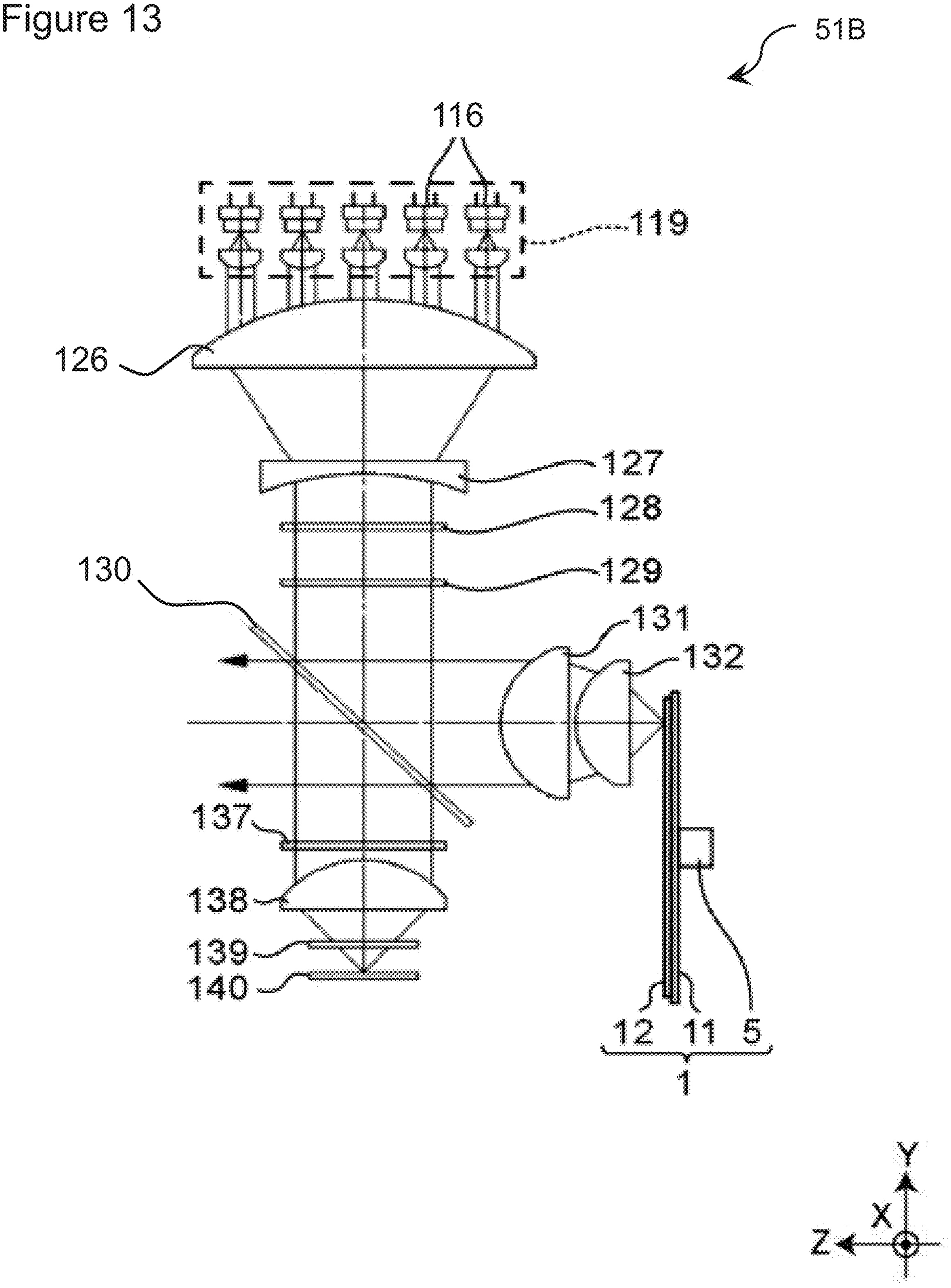
FIG. 13 is a diagram illustrating a configuration example of a light source device according to a fifth embodiment of the present disclosure.
Figure 14:
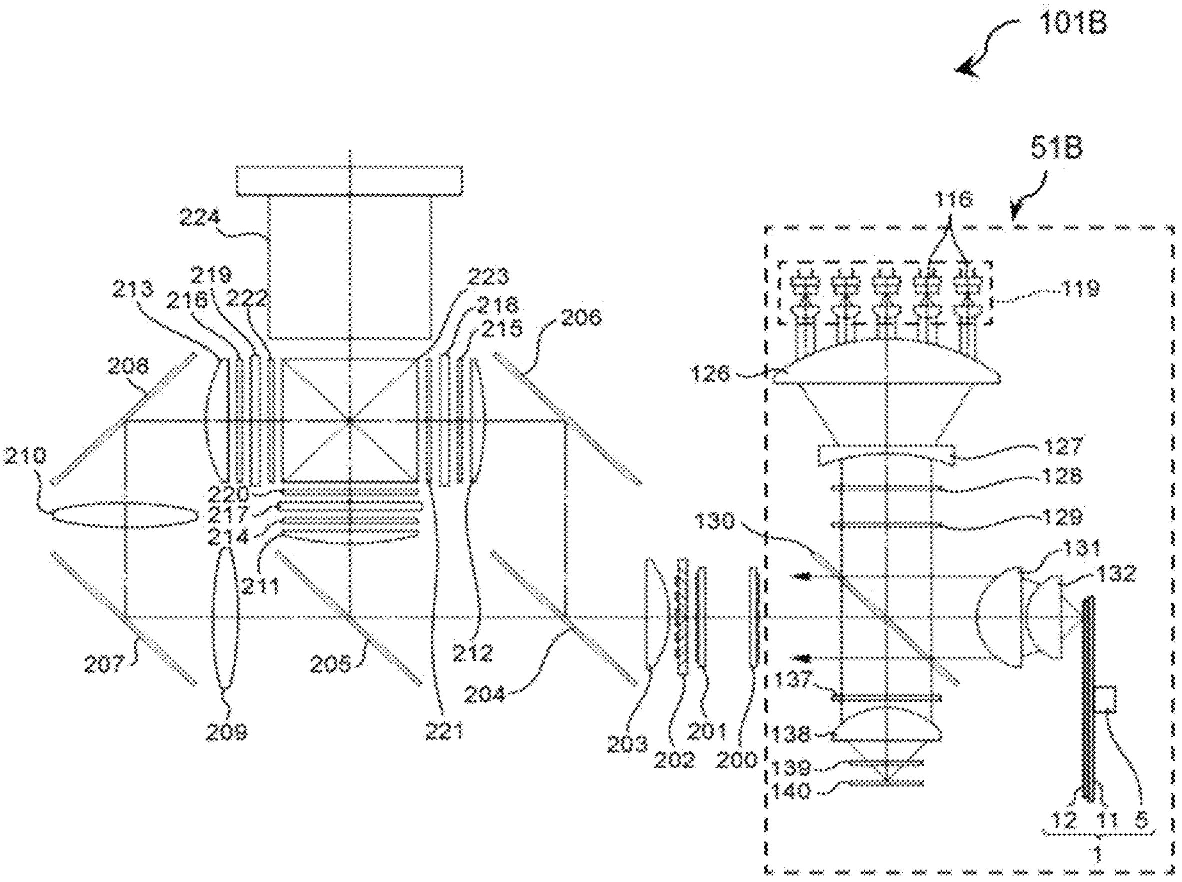
FIG. 14 is a diagram showing a configuration example of a projection-type image display device including the light source device shown in FIG. 13.

Configurations of the light source device and the projection-type image display device according to a fifth embodiment will hereinafter be described with reference to FIGS. 13 and 14. FIG. 13 is a diagram showing a configuration example of a light source device 51B according to the fifth embodiment of the present disclosure. FIG. 14 is a diagram showing a configuration example of a projection-type image display device 101B including the light source device 51B shown in FIG. 13.

The fifth embodiment relates to a light source device 51B including the wavelength conversion wheel 1A or 1B of the third embodiment, and the projection-type image display device 101B including the light source device 51B. In the following description, the wavelength conversion wheel of the light source device 51B will be described as the wavelength conversion wheel 1. Detailed description of the wavelength conversion wheel 1 will be omitted.

The projection-type image display device 101B according to a fifth embodiment of the present invention may operate in a twisted nematic (TN) mode or vertical alignment (VA) mode, in which an active matrix type transmissive liquid crystal panel with thin film transistors formed in the pixel area is used.

As shown in FIG. 13, the light source device 51B is composed of a blue semiconductor laser 116, a blue solid-state light source unit 119, lenses 126 and 127, a first diffusion plate 128, a first retardation plate 129, a polarization and color separation mirror 130, convex lenses 131, 132, a λ/4 wave plate 137 that serves as a second retardation plate, a condenser lens 138, a second diffusion plate 139, a mirror 140, and the wavelength conversion wheel 1.

Blue light emitted from the blue solid-state light source unit 119, which is composed of plural sets of blue semiconductor lasers 116 and corresponding collimator lenses, has the beam width narrowed by a convex lens 126, then the beam is collimated by the concave lens 127, and is uniformed by the first diffusion plate 128. The first retardation plate 129 rotates the polarization direction of the blue light emitted from the blue solid-state light source unit 119, thereby adjusting the ratio of blue light and fluorescent light in the white light to be generated in the following optical system. The light output from the first retardation plate 129 enters the polarization and color separation mirror 130 arranged at approximately 45 degrees with respect to the optical axis.

The polarization and color separation mirror 130 has the characteristics of transmitting the P-polarized light from the blue semiconductor laser 116 and the wavelength-converted light output from the wavelength conversion wheel 1 that will be described below, while reflecting the S-polarized light of the blue semiconductor laser 116.

The S-polarized blue light emitted from the blue solid-state light source unit 119 is reflected at the polarization and color separation mirror 130, changing the traveling direction, and is incident on the convex lens 131. The blue light passes through the convex lens 131, 132, and is incident on a ring-shaped excitation light focusing area (refer to FIGS. 10A and 10B) formed by the wavelength conversion element 12 in the wavelength conversion wheel 1. The wavelength conversion wheel 1 includes the motor 5 and is arranged so that the blue excitation light focused by the convex lenses 131, 132 is incident on the wavelength conversion element 12 arranged in a ring shape around the axis of the wavelength conversion wheel 1.

The blue light incident on the wavelength conversion element 12 of the wavelength conversion wheel 1 is wavelength converted, changing the traveling direction by 180 degrees, and enters the convex lenses 131, 132 again. Collimated light is output and enters the polarization and color separation mirror 130.

The P-polarized light emitted from the blue solid-state light source unit 119 passes through the polarization and color separation mirror 130 and is incident on the λ/4 wave plate 137, where the linearly polarized light is converted to circularly polarized light. The circularly polarized blue light then passes through the condenser lens 138 and the diffuser plate 139, and is collected on the mirror 140. The light reflected at the mirror 140 passes through the diffuser plate 139, and is incident on the condenser lens 138. Collimated light output from the convex lens 138 enters the λ/4 wave plate 137 again, where the circularly polarized light is converted to S-polarized light.

The S-polarized blue laser light output from the λ/4 wave plate 137 enters the polarization and color separation mirror 130, changing the traveling direction by 90 degrees, and getting combined with the wavelength-converted light from the wavelength conversion wheel 1 described above, resulting in a white light output.

The light output from the light source device 51B is incident on projection lens 224 via an optical system consisting of a first lens array plate 200, a second lens array plate 201, a polarization conversion element 202, a superimposing lens 203, a blue-reflecting dichroic mirror 204, a green-reflecting dichroic mirror 205, mirrors 206, 207, and 208, relay lenses 209 and 210, field lenses 211, 212, and 213, incident side polarizing plates 214, 215, and 216, liquid crystal panels 217, 218, and 219, exit side polarizing plates 220, 221, and 222, and a color combining prism 223 composed of a red-reflecting dichroic mirror and a blue-reflecting dichroic mirror.

White light from the light source device 51B is incident on the first lens array plate 200 composed of a plurality of lens elements. The incident light beam is divided into a number of light beams. The divided light beams are converged on a second lens array plate 201 composed of a plurality of lenses. The lens elements of the first lens array plate 200 have an aperture shape similar to that of the liquid crystal panels 217, 218, and 219. The focal length of the lens elements of the second lens array plate 201 is arranged so that the first lens array plate 200 and the liquid crystal panels 217, 218, and 219 are in a substantially conjugate relationship. The light output from the second lens array plate 201 is incident on the polarization conversion element 202.

The polarization conversion element 202 is composed of a polarization separation prism and a ½ wavelength plate, and converts incident natural light into light in one polarization direction. The incident wavelength-converted light is natural light, and is polarized and converted into one polarization direction, while the incident blue light is S-polarized light, and is converted into P-polarized light. The light output from the polarization conversion element 202 is incident on the superimposing lens 203. The superimposing lens 203 is a lens for superimposing and irradiating the light output from each lens element of the second lens array plate 201 on the liquid crystal panels 217, 218, and 219. The first lens array plate 200, the second lens array plate 201, the polarization conversion element 202, and the superimposing lens 203 form an illumination optical system.

The light output from the superimposing lens 203 is separated into blue, green, and red color lights by the color separation elements including the blue-reflecting dichroic mirror 204 and the green-reflecting dichroic mirror 205. The green light passes through the field lens 211 and the incident side polarizing plate 214, then enters the liquid crystal panel

217. The blue light is reflected by the mirror 206, and passes through the field lens 212 and incident side polarizing plate 215, then enters liquid crystal panel 218. The red light is refracted and reflected by the relay lenses 209, 210 and mirrors 207, 208, and passes through the field lens 213 and the incident side polarizing plate 216, then enters the liquid crystal panel 219.

The three liquid crystal panels 217, 218, and 219 change the polarization of the incident light by controlling the voltage applied to the pixels according to the image signal, and modulate the light by adjusting the incident side polarizing plates 214, 215, 216 together with the exit side polarizing plates 220, 221, 222 to form green, blue, and red images. The incident side polarizing plates 214, 215, 216 and the exit side polarizing plates 220, 221, 222 are positioned on both sides of each of the liquid crystal panels 217, 218, and 219 respectively so that the transmission axes are orthogonally aligned. The color lights transmitted through the exit side polarizing plates 220, 221, 222 enter the color combining prism 223, where the red light is reflected by a red-reflecting dichroic mirror and the blue light is reflected by a blue-reflecting dichroic mirror. The red light and the blue light are combined with the green light. The combined light enters a projection lens 224, enlarged and projected onto a projection target such as a screen (not shown).

According to the light source device 51B and the projection-type image display device 101B of the fifth embodiment, including the wavelength conversion wheel 1A (refer to FIG. 10A) composed of the arched segments or the wavelength conversion wheel 1B (refer to FIG. 10B) composed of the partially arched segments, it is possible to improve production efficiency and yield.

Sixth Embodiment

Figure 15:
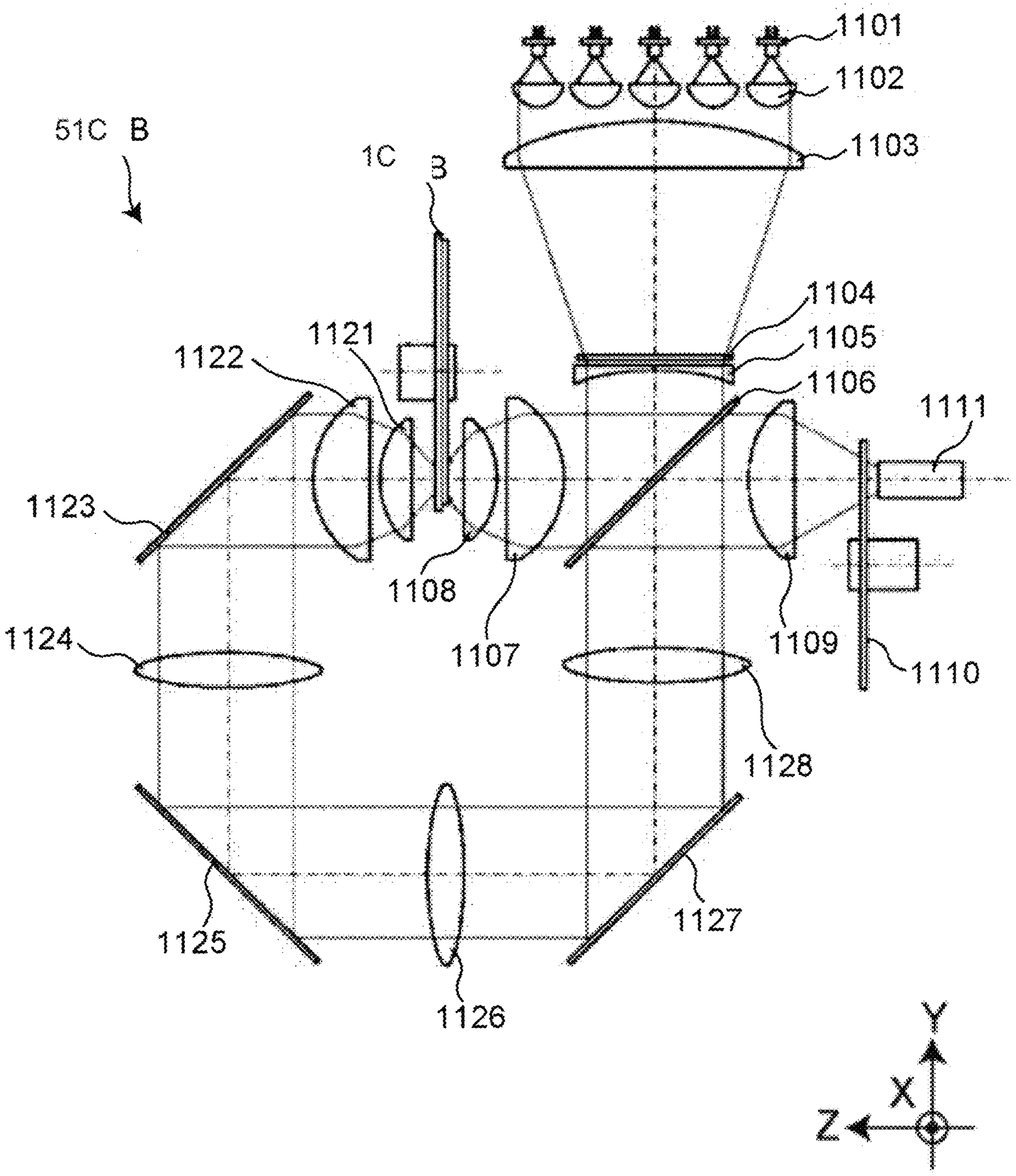
FIG. 15 is a diagram showing a configuration example of a light source device according to a sixth embodiment of the present disclosure.
Figure 16:
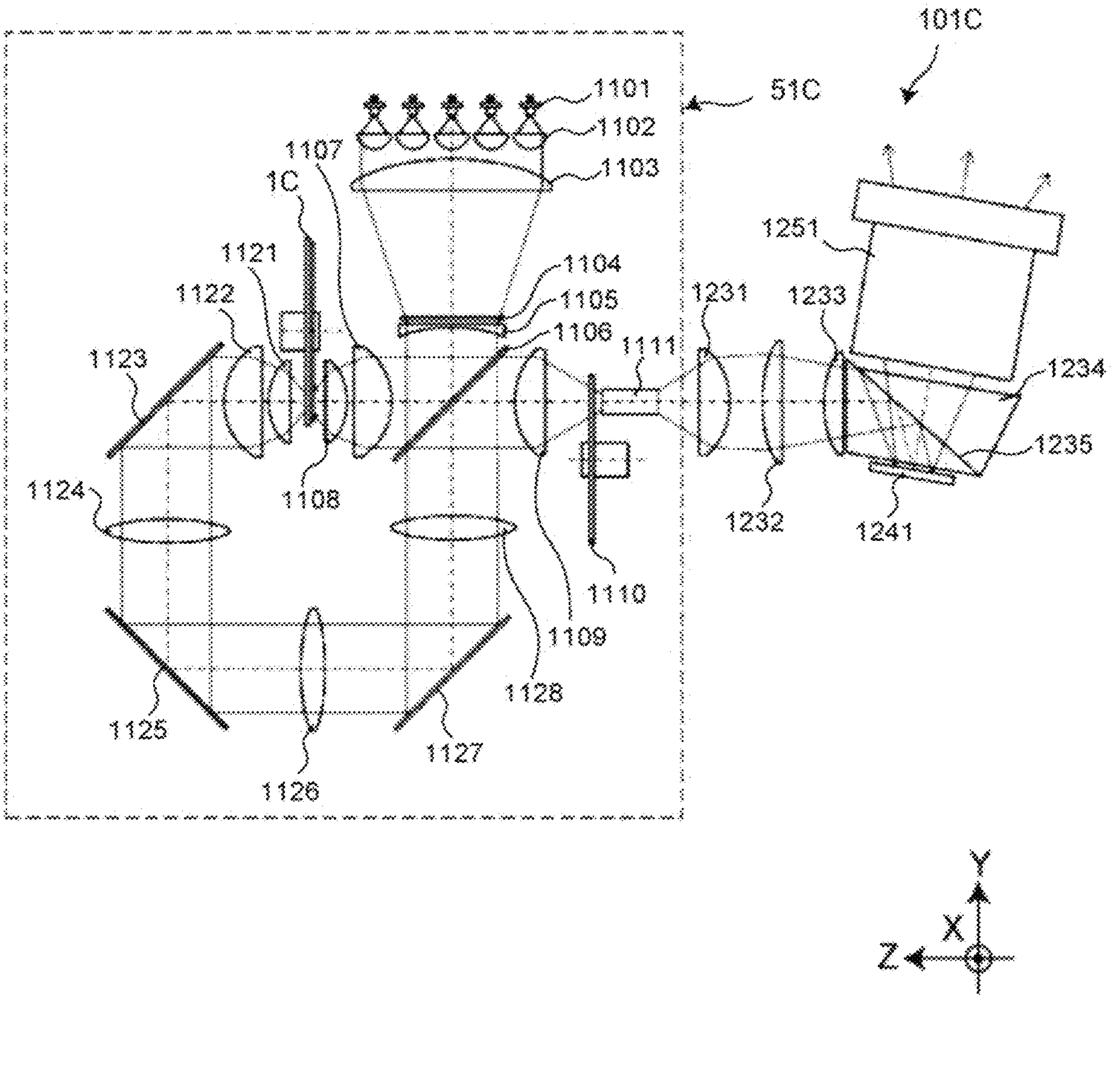
FIG. 16 is a diagram showing a configuration example of a projection-type image display device including the light source device shown in FIG. 15.

Configurations of the light source device and the projection-type image display device according to a sixth embodiment will hereinafter be described with reference to FIG. 15 and FIG. 16. FIG. 15 is a diagram showing a configuration example of a light source device 51C according to the sixth embodiment of the present disclosure. FIG. 16 is a diagram showing a configuration example of a projection-type image display device 101C including the light source device 51C shown in FIG. 15.

The sixth embodiment relates to the light source device 51C including the wavelength conversion wheel 1C of the third embodiment, and the projection-type image display device 101C including the light source device 51C. In the following description, detailed description of the wavelength conversion wheel 1C will be omitted.

The light source device 51C of the sixth embodiment is, for example, a light source device for a one-chip type projection-type image display device. As shown in FIG. 15, laser light in the blue wavelength range emitted from a plurality of laser light sources 1101 is collimated by a plurality of collimator lenses 1102 disposed corresponding to each of the laser light sources 1101. The collimated blue light enters the convex lens 1103, where the light beam width is narrowed, and then enters the diffusion plate 1104, where the light uniformity is improved. The blue light output from the diffuser plate 1104 is then collimated by the concave lens 1105.

The blue light output from the concave lens 1105 enters a color-separation mirror 1106 arranged at an angle of approximately 45 degrees with respect to the optical axis, where the traveling direction of the light is changed by 90 degrees and enters the convex lens 1107. The color-separation mirror 1106 has spectral characteristics of reflecting light in the wavelength range of the blue light emitted from the laser light source 1101 while allowing wavelength-converted light from the wavelength conversion wheel 1C to pass through.

Here, the color-separation mirror 1106 has spectral characteristics according to the wavelength of the blue light from the laser light source and that of the wavelength-converted light obtained from the wavelength conversion wheel, but the present disclosure is not limited thereto. For example, the mirror 906 may have spectral characteristics according to the polarization direction of the laser light source. By adjusting the blue light from the laser light source to have the same polarization direction, it is possible to allow blue light with a specific polarization direction from the laser light source to pass through and reflect light of the wavelength-converted light obtained from the wavelength conversion wheel.

The blue light passes through the convex lens 1107, 1108 and is incident on a ring-shaped excitation light focusing area (refer to FIG. 10C) formed by the wavelength conversion element and the opening in the wavelength conversion wheel 1C. With the wavelength conversion wheel 1C rotating around the axis, the excitation blue light passed the convex lenses 1107, 1108 can be incident alternately on the wavelength conversion element and the opening.

The blue light passed the convex lenses 1107, 1108 is wavelength-converted at the wavelength conversion wheel 1C, changing the traveling direction by 180 degrees, then enters the convex lenses 1107, 1108 again, and is output as parallel light. The wavelength region of the wavelength-converted light here is optimized so as to compose, for example, white light in combination with the blue light emitted from the laser light source 1101.

The paralleled wavelength-converted light output from the convex lens 1107 is incident again on the color-separation mirror 1106. As the color-separation mirror 1106 has the characteristic of transmitting the wavelength-converted light, the wavelength-converted light passes through without changing the traveling direction.

Next, the blue light incident on the opening of the wavelength conversion wheel 1C passes through the wavelength conversion wheel 1C and is collimated by the convex lenses 1121, 1122. The collimated light is guided by a relay lens system composed of three mirrors 1123, 1125, 1127 and three convex lenses 1124, 1126, 1128. The output light from the relay lens system is collimated and enters the color-separation mirror 1106 in the opposite direction of the light from the laser light source 1101. Although the relay optical system is configured by three mirrors and three convex lenses here, other configurations may be used as long as similar performance is achieved.

The blue light output from the convex lens 1128 is reflected at the color-separation mirror 1106, changing the traveling direction by 90 degrees.

With the above configuration, the wavelength-converted light and the blue light combined at the color-separation mirror 1106 are time-divisionally incident on the convex lens 1109.

The time-divided wavelength-converted light and blue light output from the color-separation mirror 1106 are collected by the convex lens 1109 and incident on the color filter wheel 1110. The color filter wheel 1110 is synchronized with the wavelength conversion wheel 1C by using a synchronization circuit (not shown), and is composed of a plurality of filters configured to transmit some or all of the wavelength ranges of the blue light and the wavelength-converted light according to the performance of the optical system.

During a period in which, for example, yellow wavelength-converted light is output from the wavelength conversion wheel 1C, the synchronously rotating color filter wheel 1110 has at least one of the following regions: a region that transmits the wavelength-converted light as it is, a region that reflects the red light of the wavelength-converted light and transmits the green light, a region that reflects the green light of the wavelength-converted light and transmits the red light, etc. The blue light passed through the opening of the wavelength conversion wheel 1C may be arranged to correspond to the region that transmits wavelength-converted light. In this manner, color lights of different wavelength ranges are incident in time series at the incident end of the rod integrator 1111.

The light is uniformed in the rod integrator 1111, and the uniformed light is output from the exit end thereof.

In the sixth embodiment, the color filter wheel 1110 is disposed at the incident end of the rod integrator 1111. However, the present disclosure is not limited thereto. The color filter wheel 1110 may be disposed at the exit end of the rod integrator 1111.

The projection-type image display device 101C according to the sixth embodiment is, for example, a one-chip type projection-type image display device as shown in FIG. 16. The projection-type image display device 101C includes the light source device 51C.

The light output from the rod integrator 1111 is imaged onto a DMD 1241 (described later) by a relay lens system including convex lenses 1231, 1232, and 1233.

The light passed through the convex lenses 1231, 1232, and 1233 enters the total reflection prism 1234 and incident on a micro gap 1235 of the total reflection prism 1234 at an angle equal to or greater than the total reflection angle, reflected and changing the traveling direction, then enters the DMD 1241.

The DMD 1241 changes the angles of the micromirrors in response to a signal received from an image circuit (not shown) synchronized with the color light obtained by the combination of light from the wavelength conversion wheel 1C and that from the color filter wheel 1110, and output light in a different direction.

The light output from the DMD 1241, enters the total reflection prism 1234, and incident on the micro gap 1235 of the total reflection prism 1234 at an angle less than the total reflection angle, passing through, and then enters a projection lens 1251, projected onto a projection object (not shown).

According to the light source device 51C and the projection-type image display device 101C of the sixth embodiment, by using the wavelength conversion wheel 1C (refer to FIG. 10C) composed of the arched segments or the partially arched segments, it is possible to improve production efficiency and yield.

Seventh Embodiment

Figure 17:
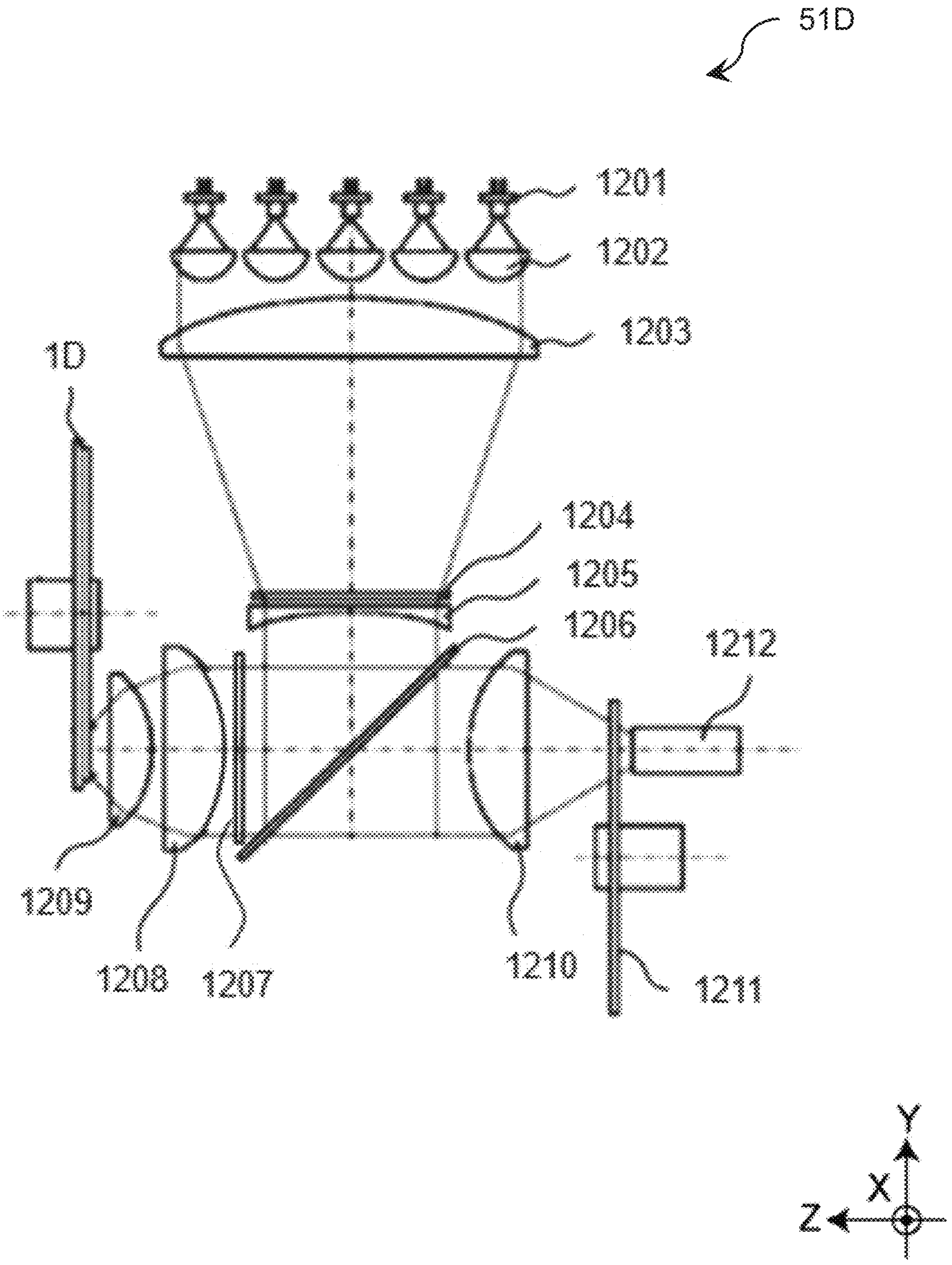
FIG. 17 is a diagram showing a configuration example of a light source device according to a seventh embodiment of the present disclosure.
Figure 18:
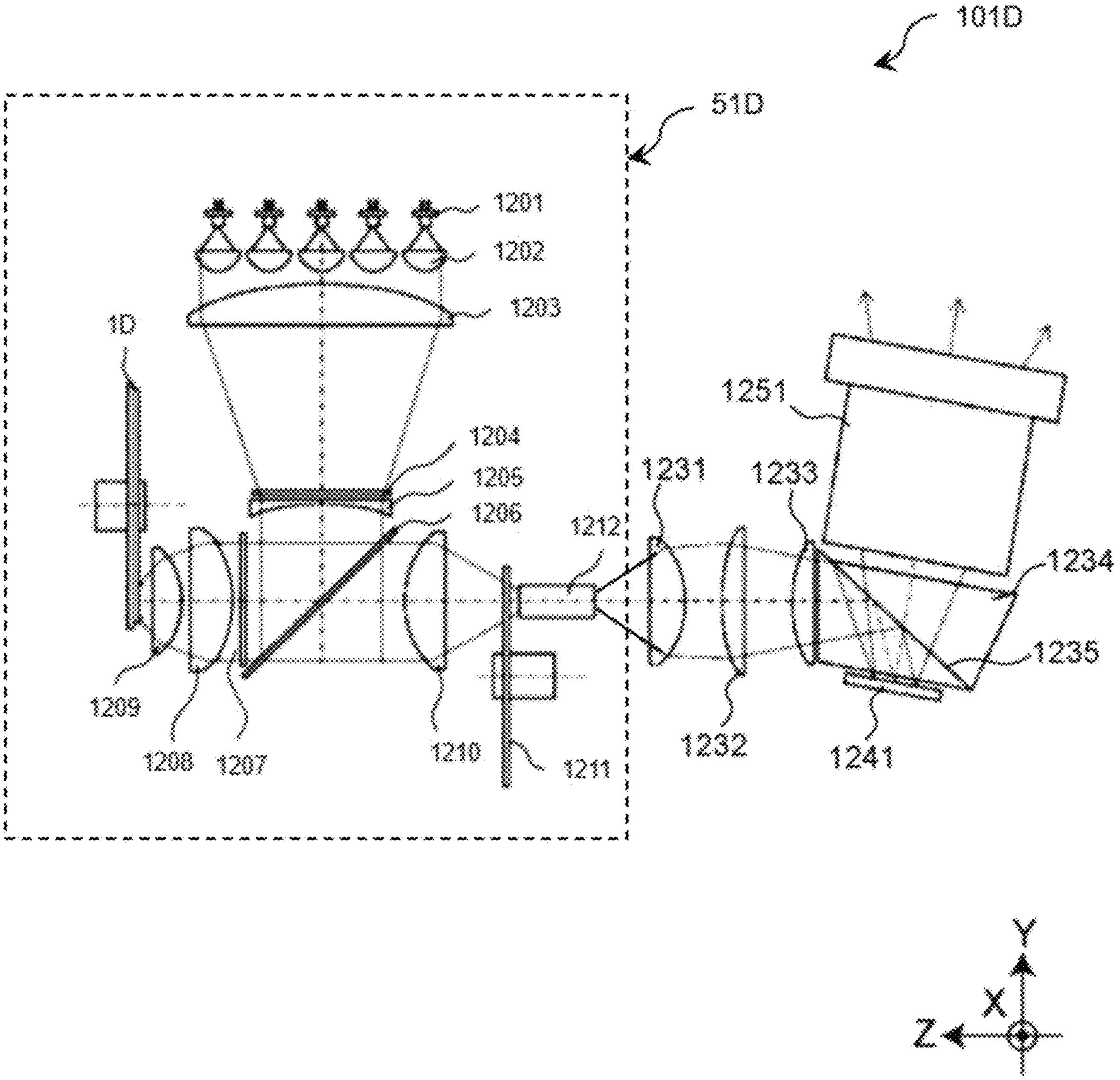
FIG. 18 is a diagram showing a configuration example of a projection-type image display device including the light source device shown in FIG. 17.

Configurations of the light source device and the projection-type image display device according to a seventh embodiment will hereinafter be described with reference to FIGS. 17 and 18. FIG. 17 is a diagram showing a configuration example of a light source device 51D according to the seventh embodiment of the present disclosure. FIG. 18 is a diagram showing a configuration example of a projection-type image display device 101D including the light source device 51D shown in FIG. 17.

The seventh embodiment relates to the light source device 51D including the wavelength conversion wheel 1D of the third embodiment, and the projection-type image display device 101D including the light source device 51D. In the following description, detailed description of the wavelength conversion wheel 1D will be omitted.

The light source device 51D of the seventh embodiment is, for example, a light source device for a one-chip type projection-type image display device. As shown in FIG. 17, laser light in the blue wavelength range emitted from a plurality of laser light sources 1201 is collimated by a plurality of collimator lenses 1202 provided corresponding to each of the laser light sources 1201. The collimated blue light enters the convex lens 1203, where the light beam width is narrowed, and then enters the diffuser plate 1204, where the light uniformity is improved. The blue light output from the diffuser plate 1204 is then collimated by the concave lens 1205.

The polarization direction of the laser light is adjusted in the optical system so that the output light from the concave lens 1205 becomes S-polarized light with respect to the polarization-color-separation-combining mirror 1206 described later.

The collimated blue light output from the concave lens 1205 enters the polarization-color-separation-combining mirror 1206 arranged at an angle of approximately 45 degrees with respect to the optical axis, changing the traveling direction by 90 degrees, and then enters the λ/4 wave plate 1207. The mirror 1206 has spectral characteristics of reflecting S-polarized light in the blue wavelength range emitted from the laser light sources 1201, while transmitting P-polarized light in the blue wavelength range emitted from the laser light sources 1201 and the wavelength-converted light generated by the wavelength conversion wheel 1D.

The polarization direction of blue light from laser light sources 1201 is rotated and changed to circularly polarized light at the λ/4 wave plate 1207.

The light output from the λ/4 wave plate 1207 passes through the convex lens 1208, 1209, and is incident on a ring-shaped excitation light focusing area (refer to FIG. 10D) formed by the wavelength conversion element and the reflective area in the subsequent wavelength conversion wheel 1D. With the wavelength conversion wheel 1D rotating around the axis, the blue excitation light passed the convex lenses 1208, 1209 can be incident alternately on the wavelength conversion element and the reflective area.

The blue light passed through the convex lenses 1208, 1209 is wavelength-converted on the wavelength conversion element (refer to FIG. 10D) in the wavelength conversion wheel 1D, changing the traveling direction by 180 degrees, then enters the convex lenses 1208, 1209 again, and is output as parallel light. The wavelength ranges of the wavelength-converted light generated by the wavelength conversion wheel 1D are optimized so as to compose white light in combination with the blue light emitted from the laser light sources 1201.

The paralleled wavelength-converted light output from the convex lens 1208 passes through the λ/4 wave plate 1207 and again enters the polarization-color-separation-combining mirror 1206 that is arranged at an angle of 45 degrees to the optical axis. As the mirror 1206 has the characteristic of transmitting the wavelength-converted light, wavelength-converted light passes without changing the traveling direction, and then enters the convex lens 1210.

On the other hand, the blue light from the laser light sources 1201 incident on the reflective area of the wavelength conversion wheel 1D (refer to FIG. 10D) is reflected, changing the traveling direction by 180 degrees, then enters the convex lenses 1208, 1209 again, and is output as a parallel beam.

The paralleled blue light output from the convex lenses 1208 is incident on the λ/4 wave plate 1207, where its polarization direction is rotated and is output as P-polarized light.

The P-polarized light in the blue wavelength range output from the λ/4 wave plate 1207 is then incident on the polarization-color-separation-combining mirror 1206 that is disposed at an angle of approximately 45 degrees with respect to the optical axis. The mirror 1206 has the characteristics of reflecting the S-polarized light in the blue wavelength range output from the laser light sources 1201, while transmitting the P-polarized light in the blue wavelength range output from the laser light sources 1201 and the wavelength-converted light obtained by the wavelength conversion wheel 1D. Thus, the P-polarized light in the blue wavelength range output from the λ/4 waveplate 1207 passes through without changing the traveling direction, and is incident on the convex lens.

The wavelength converted light and the blue light are incident on the convex lens 1210 in time series in response to the rotation of the wavelength conversion wheel 1D, and are focused near the incident end of a rod integrator 1212 which will be described later. The light focused by the convex lens 1210 is incident on the color filter wheel 1211. The color filter wheel 1211 has the configuration similar to that of the color filter wheel 1110 employed in the light source device 51C according to the sixth embodiment shown in FIG. 15. The wavelength conversion wheel 1D and the color filter wheel 1211 rotate synchronously, resulting the color lights of different wavelength ranges are incident in time series at the incident end of the rod integrator 1212.

The time-divided light of different wavelength regions incident on the rod integrator 1212 is uniformed by the rod integrator and output from the exit end. In this embodiment, color filter wheel 1211 is disposed at the incident end of the rod integrator. However, the present disclosure is not limited thereto. The color filter wheel 1211 may be disposed at the exit end of the rod integrator.

The projection-type image display device 101D according to the seventh embodiment is, for example, a one-chip type projection-type image display device, as shown in FIG. 18. The projection-type image display device 101D includes the light source device 51D. In the projection-type image display device 101D, the behavior of the light output from the rod integrator 1212 is substantially the same as the behavior of the light output from the rod integrator 1111, which has been described for the projection-type image display device 101C shown in FIG. 16. Therefore, a detailed description thereof is omitted here.

According to the light source device 51D and the projection-type image display device 101D of the seventh embodiment, including the wavelength conversion wheel 1D (refer to FIG. 10C) composed of the arched segments or the partially arched segments, it is possible to improve production efficiency and yield.

OTHER EMBODIMENTS

As above, the embodiments have been described as exemplification of the techniques disclosed in this application. However, the techniques in the present disclosure are not limited thereto, and are applicable to any embodiments to which modifications, permutations, additions, omissions, etc., have been made. Besides, new embodiments may be provided by combining constituent elements described in the embodiments. Such modifications and embodiments obtained by substantially combining the technical means disclosed in different embodiments also fall within the technical scope of the present disclosure.

As above, the embodiments have been described as exemplification of the techniques in the present disclosure. To this end, the accompanying drawings and detailed description have been provided. Accordingly, the constituent elements described in the accompanying drawings and the detailed description may encompass not only constituent elements essential for solving the problems but also constituent elements not essential for solving the problems, for the purpose of exemplifying the above techniques. Therefore, those non-essential constituent elements should not be taken as essential directly from the fact that they are described in the accompanying drawings and the detailed description.

The present disclosure is applicable to, a wavelength conversion element or a wavelength conversion wheel that is configured to generate wavelength converted light, a light source device that uses wavelength-converted light obtained by the wavelength conversion wheel, and a projection-type image display device including the light source device.

What is claimed is:

1. A wavelength conversion wheel converting incident light into light of a different wavelength, comprising:

a base plate rotatable around an axis; and at least one curved wavelength conversion element arranged on a surface of the base plate and the at least one curved wavelength conversion element including a wavelength conversion material different than the base plate, the at least one curved wavelength conversion material being capable of converting incident light to light of a wavelength different from the wavelength of the incident light, wherein the at least one curved wavelength conversion element is defined by an inner arc edge, an outer arc edge, and both side edges each connecting two corresponding end points of the inner arc edge and the outer arc edge, the outer arc edge includes a first arcuate section having substantially the same shape and arc length as that for the inner arc edge, and the at least one curved wavelength conversion element is arranged around the axis so that concave sides of the inner arc edges and the outer arc edges face toward the center of the surface of the base plate.

2. The wavelength conversion wheel according to claim 1, wherein the outer arc edge has an inflection point in the vicinity of the side edge on at least a first side of the at least one curved wavelength conversion element, between an endpoint of the outer arc edge on the first side and an endpoint of the first arcuate section on the first side, and an end portion of the outer arc edge including the inflection point has a shape different from the shape of the inner arc edge.

3. The wavelength conversion wheel according to claim 2, wherein the end portion of the outer arc edge includes a second arcuate section and a third arcuate section, and the second arcuate section and the third arcuate section have opposite curvature directions and are in contact with each other at the inflection point.

4. The wavelength conversion wheel according to claim 3, wherein
the first arcuate section and the second arcuate section lie on a circumference of a first circle,
the third arcuate section lies on a circumference of a second circle, and
the first circle and the second circle are circles externally tangent to each other at the inflection point.

5. The wavelength conversion wheel according to claim 2, wherein
the end portion of the outer arc edge includes a rectilinear section passing through the inflection point.

6. The wavelength conversion wheel according to claim 5, wherein
the first arcuate section and one endpoint of the rectilinear section lie on a circumference of a first circle,
one endpoint of the rectilinear section lies on a circumference of a second circle, and
the first circle and the second circle are circles externally tangent to each other at the inflection point.

7. The wavelength conversion wheel according to claim 1, wherein
endpoints on the same side of the first arcuate section and the inner arc edge lie on a line orthogonal to a line connecting both endpoints of the inner arc edge.

8. The wavelength conversion wheel according to claim 1, wherein
endpoints on the same side of the first arcuate section and the inner arc edge lie on the side edge on one side.

9. The wavelength conversion wheel according to claim 2, wherein
the inflection point lies near the side edge on one side, and endpoints on the same side of the first arcuate section and the inner arc edge lie on the side edge on the other side.

10. The wavelength conversion wheel according to claim 1, wherein
the at least one curved wavelength conversion element is arranged in a ring shape around the axis, the ring shape including a missing part, and
the base plate has an opening at a position corresponding to the missing part of the at least one curved wavelength conversion element.

11. The wavelength conversion wheel according to claim 1, wherein
the at least one curved wavelength conversion element is arranged in a ring shape around the axis, the ring shape including a missing part, and
the base plate has a reflective area at a position corresponding to the missing part of the at least one curved wavelength conversion element.

12. The wavelength conversion wheel according to claim 1, wherein
the at least one curved wavelength conversion element is arranged in a ring shape around the axis, and
a part area of the ring shape is configured to be a reflective area.

13. The wavelength conversion wheel according to claim 1, wherein
the first arcuate section of the at least one curved wavelength conversion element is configured to be arranged along a circumference around the axis.

14. The wavelength conversion wheel according to claim 1, comprising:
at least two curved wavelength conversion elements including wavelength conversion materials that are capable of generating light of different wavelengths from each other.

15. A light source device comprising:
a light source configured to emit incident light; and
the wavelength conversion wheel of claim 1.

16. A projection-type image display device comprising:
the light source device of claim 15;
a light modulation element configured to modulate incident light based on an image signal;
an illumination optical system configured to direct illumination light emitted from the light source device to the light modulation element; and
a projection optical system configured to enlarge and project light output from the light modulation element to display an image.

17. A wavelength conversion wheel converting incident light into light of a different wavelength, comprising:
a base plate rotatable around an axis; and
at least one curved wavelength conversion element arranged on a surface of the base plate and the at least one curved wavelength conversion element including a wavelength conversion material different than the base plate, the at least one curved wavelength conversion material being capable of converting incident light to light of a wavelength different from the wavelength of the incident light, wherein
the at least one curved wavelength conversion element is defined by an inner arc edge, an outer arc edge, and both side edges each connecting two corresponding end points of the inner arc edge and the outer arc edge,
the outer arc edge includes a first arcuate section having substantially the same shape and arc length as that for the inner arc edge,
the at least one curved wavelength conversion element is arranged around the axis so that concave sides of the inner arc edges and the outer arc edges face toward the center of the surface of the base plate,
the outer arc edge has an inflection point in the vicinity of the side edge on at least a first side of the at least one curved wavelength conversion element, between an endpoint of the outer arc edge on the first side and an endpoint of the first arcuate section on the first side, and
an end portion of the outer arc edge including the inflection point has a shape different from the shape of the inner arc edge.

18. A wavelength conversion wheel converting incident light into light of a different wavelength, comprising:
a base plate rotatable around an axis; and
at least one curved wavelength conversion element arranged on the base plate and the at least one curved wavelength conversion element including a wavelength conversion material different than the base plate, the at least one curved wavelength conversion material being capable of converting incident light to light of a wavelength different from the wavelength of the incident light, wherein
the at least one curved wavelength conversion element is defined by an inner arc edge, an outer arc edge, and both side edges each connecting two corresponding end points of the inner arc edge and the outer arc edge, and
the outer arc edge has an inflection point in the vicinity of the side edge on at least a first side of the at least one curved wavelength conversion element, between an endpoint of the outer arc edge on the first side and an endpoint of the first arcuate section on the first side, and an end portion of the outer arc edge including the inflection point has a shape different from the shape of the inner arc edge.

* * * * *